(12) United States Patent
Chao et al.

(10) Patent No.: US 12,540,843 B2
(45) Date of Patent: Feb. 3, 2026

(54) SECOND GENERATION NIST KIBBLE BALANCE AND DETERMINING ABSOLUTE MASS

(71) Applicant: Government of the United States of America, as represented by the Secretary of Commerce, Gaithersburg, MD (US)

(72) Inventors: Leon Shih Chao, Gaithersburg, MD (US); Gordon Allan Shaw, III, Takoma Park, MD (US); Stephan Schlamminger, Silver Spring, MD (US); Yusi Cao, Germantown, MD (US)

(73) Assignee: Government of the United States of America, as represented by the Secretary of Commerce, Gaithersburg, MD (US)

( * ) Notice: Subject to any disclaimer, the term of this patent is extended or adjusted under 35 U.S.C. 154(b) by 361 days.

(21) Appl. No.: 18/199,264

(22) Filed: May 18, 2023

(65) Prior Publication Data
US 2023/0375396 A1   Nov. 23, 2023

Related U.S. Application Data

(60) Provisional application No. 63/343,117, filed on May 18, 2022.

(51) Int. Cl.
*G01G 21/16* (2006.01)
*G01G 1/24* (2006.01)
(Continued)

(52) U.S. Cl.
CPC ........... *G01G 21/166* (2013.01); *G01G 1/243* (2013.01); *G01G 1/29* (2013.01); *G01G 23/01* (2013.01)

(58) Field of Classification Search
CPC ........ G01G 21/166; G01G 1/243; G01G 1/29; G01G 23/01; G01G 1/20
(Continued)

(56) References Cited

U.S. PATENT DOCUMENTS 11,187,571 B2    11/2021  Chao et al.
11,562,049 B2 *   1/2023  Gorshkov ............... G06F 17/17
(Continued)

FOREIGN PATENT DOCUMENTS

DE         102021130144 B3      1/2023

OTHER PUBLICATIONS

Measurement, Testing and Sensor Technology, Horst Czichos, 2018. (Year: 2018).*
(Continued)

*Primary Examiner* — Jacques M Saint Surin
(74) *Attorney, Agent, or Firm* — Office of Chief Counsel for National Institute of Standards and Technology

(57) ABSTRACT

A second generation NIST Kibble balance includes: a main body including a main body fulcrum node; a lever bar in mechanical communication with the main body and that pivots about the main body fulcrum node; a central flexural bridge in flexural mechanical communication with the main body and the lever bar; a measurement mass arm mechanically coupled to the main body via the lever bar, the central flexural bridge, and a mass arm flexural bridge; the mass arm flexural bridge in flexural mechanical communication with the measurement mass arm and the lever bar; a reference force arm mechanically coupled to the main body via the lever bar, the central flexural bridge, and a reference arm flexural bridge; and the reference arm flexural bridge in flexural mechanical communication with the reference force arm and the lever bar.

19 Claims, 20 Drawing Sheets

(51) Int. Cl.
  *G01G 1/29*   (2006.01)
  *G01G 23/01*  (2006.01)
(58) Field of Classification Search
  USPC .......................................................... 177/264
  See application file for complete search history.

(56) References Cited

U.S. PATENT DOCUMENTS 11,846,560 B2 * 12/2023 Lin .................... G01M 11/0214
2023/0057756 A1 * 2/2023 Zhang .................. G06F 7/5443

OTHER PUBLICATIONS

NIST Kibble Balance Performance, Seifert et al., Conference on Precision Electromagnetic Measurements, Aug. 13, 2018. (Year: 2018).*

The Design and Development of a Tabletop Kibble Balance at NIST Leon Chao, Frank Seifert, Darine Haddad, Member, IEEE, Julian Stirling, David Newell, and, Stephan Schlamminger, Member, IEEE, Jun. 2019. (Year: 2019).*

Cao, Y., et al., "The design and development of the second generation tabletop Kibble balance at NIST", EUSPEN, euspen's 22nd International Conference & Exhibition, Geneva, CH, May/Jun. 2022, uploaded Jun. 3, 2022, Accessed: May 15, 2023, DOI: https://www.euspen.eu/knowledge-base/ICE22281.pdf.

* cited by examiner (A) 200

(B) 200

(C) 200

(A) 200

(B) 200

Point of attachment of 201

(A) Flexural member (B) Flexural member (C) Flexural member (D) Flexural member

On-Axis Force (E) Flexural member (F) Flexural member

Off-Axis Force (A)  202

(B)  225

202

202

SECOND GENERATION NIST KIBBLE BALANCE AND DETERMINING ABSOLUTE MASS

CROSS REFERENCE TO RELATED APPLICATIONS

This application claims the benefit of U.S. Provisional Patent Application Ser. No. 63/343,117 (filed May 18, 2022), which is herein incorporated by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in this invention.

BRIEF DESCRIPTION

Disclosed is a second generation NIST Kibble balance for determining absolute mass, the second generation NIST Kibble balance comprising: a main body that provides a stationary platform: for displacement motion of a measurement mass arm and a reference force arm relative to the main body and for pivotal motion of a lever bar relative to the main body, the main body comprising a main body fulcrum node that is a fixed pivot for the lever bar; the lever bar in mechanical communication with the main body and that pivots about the main body fulcrum node and comprising a lever bar attachment node, such that the lever bar is suspended from the main body by a central flexural bridge disposed on the lever bar at the lever bar attachment node and pivotally moves to restore mass balance between the measurement mass arm and the reference force arm; the central flexural bridge in flexural mechanical communication with the main body and the lever bar, such that central flexural bridge: is disposed on the main body at the main body fulcrum node, is interposed between the main body and the lever bar, and flexes in response to pivotal motion of the lever bar relative to the main body; the measurement mass arm disposed proximate to and mechanically coupled to the main body via the lever bar, the central flexural bridge, and a mass arm flexural bridge, the measurement mass arm comprising a mass arm attachment node; the mass arm flexural bridge in flexural mechanical communication with the measurement mass arm and the lever bar, such that mass arm flexural bridge: is disposed on the measurement mass arm at the mass arm attachment node, is interposed between the measurement mass arm and the lever bar, and flexes in response to pivotal motion of the lever bar relative to the main body; the reference force arm disposed proximate to and mechanically coupled to the main body via the lever bar, the central flexural bridge, and a reference arm flexural bridge, the reference force arm comprising a reference arm attachment node, such that the reference force arm moves in counter-linear motion to the measurement mass arm; and the reference arm flexural bridge in flexural mechanical communication with the reference force arm and the lever bar, such that reference arm flexural bridge: is disposed on the reference force arm at the reference arm attachment node, is interposed between the reference force arm and the lever bar, and flexes in response to pivotal motion of the lever bar relative to the main body.

Disclosed is a process for determining absolute mass, the process comprising: providing a second generation NIST Kibble balance comprising: a main body and comprising a main body fulcrum node; a lever bar in mechanical communication with the main body and that pivots about the main body fulcrum node; a central flexural bridge in flexural mechanical communication with the main body and the lever bar; a measurement mass arm mechanically coupled to the main body via the lever bar, the central flexural bridge, and a mass arm flexural bridge; the mass arm flexural bridge in flexural mechanical communication with the measurement mass arm and the lever bar; a reference force arm mechanically coupled to the main body via the lever bar, the central flexural bridge, and a reference arm flexural bridge; and the reference arm flexural bridge in flexural mechanical communication with the reference force arm and the lever bar; discretely pivoting, by the electromagnet, the lever bar relative to the main body over a plurality of different displacements of the measurement mass arm; determining a capacitance gradient dC/dZ as a function of the different displacements of the measurement mass arm that occurs from discretely pivoting the lever bar relative to the main body; fixing a moving electrode of the actuator at a specific position determined by the displacement sensor; receiving the mass on the mass pan of the measurement mass arm; measuring a first change in voltage required by the actuator to maintain the specific position; removing the mass from the mass pan; measuring a second change in voltage required by the actuator to maintain the specific position; and calculating the absolute mass of the mass from the first change in voltage, the second change in voltage, and the capacitance gradient dC/dZ.

Disclosed is a process for determining absolute mass, the process comprising: providing a second generation NIST Kibble balance comprising: a main body and comprising a main body fulcrum node; a lever bar in mechanical communication with the main body and that pivots about the main body fulcrum node; a central flexural bridge in flexural mechanical communication with the main body and the lever bar; a measurement mass arm mechanically coupled to the main body via the lever bar, the central flexural bridge, and a mass arm flexural bridge; the mass arm flexural bridge in flexural mechanical communication with the measurement mass arm and the lever bar; a reference force arm mechanically coupled to the main body via the lever bar, the central flexural bridge, and a reference arm flexural bridge; and the reference arm flexural bridge in flexural mechanical communication with the reference force arm and the lever bar; oscillating, by the electromagnet, the lever bar relative to the main body to produce oscillatory linear displacements of the measurement mass arm; calibrating an electromagnet of the actuator as a function of the oscillatory linear displacements of the measurement mass arm; determining a BL product of the actuator after calibrating the electromagnet of the actuator; fixing the actuator at a specific position determined by the displacement sensor; receiving the mass on the mass pan of the measurement mass arm; measuring a first change in voltage required by the actuator to maintain the specific position; removing the mass from the mass pan; measuring a second change in voltage required by the actuator to maintain the specific position; and calculating the absolute mass of the mass from the first change in voltage, the second change in voltage, and the BL product.

BRIEF DESCRIPTION OF THE DRAWINGS

The following description cannot be considered limiting in any way. Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
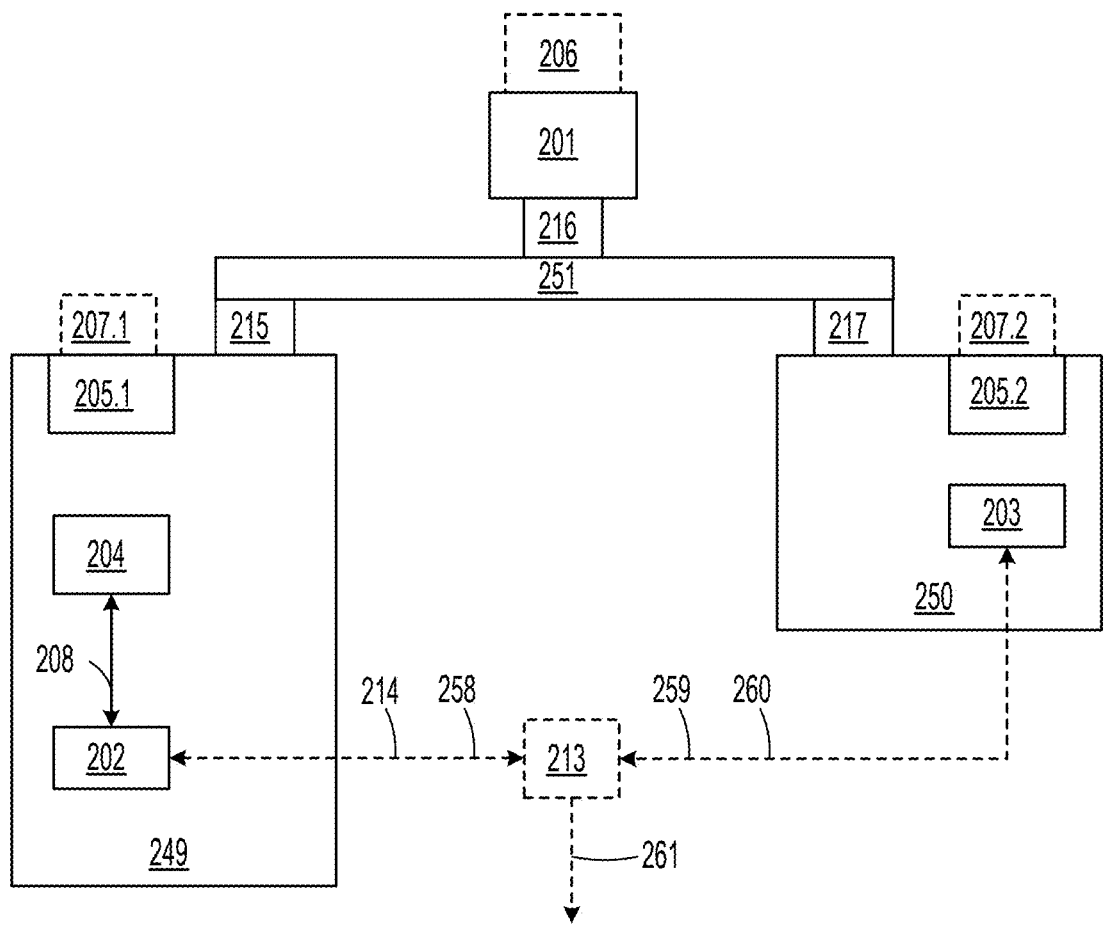
FIG. 1 shows, according to some embodiments, a second generation NIST Kibble balance 200.

A detailed description of one or more embodiments is presented herein by way of exemplification and not limitation.

To determine the true weight of something, whether it is a truck full of cargo or a sack of potatoes, it is important to use a scale that is calibrated. Calibration ensures that the scale is accurate and that the measurements are reliable. In the United States, calibration is typically done at the National Institute of Standards and Technology (NIST) with the NIST-4 Kibble balance. The NIST-4 Kibble balance is a large and expensive instrument that can measure a mass of up to roughly 1 kg to within three millionths of 1 percent. Researchers and manufacturers who need accurate mass measurements have to send their physical objects, called artifact mass standards, to NIST periodically to have them calibrated against the NIST-4 Kibble balance. This can be a time-consuming and expensive process.

A new generation of Kibble balances, called the second generation NIST Kibble balance 200, offers a more affordable and convenient alternative to the NIST-4 Kibble balance or other conventional Watt balances. The second generation NIST Kibble balance 200 can be a tabletop-sized instrument that is about the size of a ream of printer paper. It can measure masses with an accuracy 20,000 times better than a kitchen scale. The second generation NIST Kibble balance 200 is also more robust than conventional Watt balances. This means that it is less likely to be damaged during transport or use. As a result, the second generation NIST Kibble balance 200 can be used to measure a wider range of objects and in a wider range of environments. The second generation NIST Kibble balance 200 can measure a subset within a mass range, e.g., from 1 mg to 1 kg. This means that labs could skip sending mass standards to NIST for calibration annually or semi-annually, and the labs could directly realize mass on-site with the second generation NIST Kibble balance 200. Accordingly, the second generation NIST Kibble balance 200 is a significant advancement in mass measurement technology. It offers a number of advantages over the NIST-4 Kibble balance, making it a more versatile and cost-effective option for researchers and manufacturers to obtain accurate mass measurements.

The second generation NIST Kibble balance 200 is a compact weighing device that can directly measure milligram- to gram-level masses in air with uncertainties, e.g., that are less than ⅓ of the specified tolerance of the ASTM E617 Class 3 weights. These weights are typically used for calibrating commercial mass comparators. In other words, the second generation NIST Kibble balance 200 can measure masses with an accuracy from 1 to 500 parts in 10^6.

The second generation NIST Kibble balance 200 can be configured to be a commercial, end-user product such that it can be used by calibration laboratories to shorten the dissemination chain. The dissemination chain is the process of transferring measurement standards from a national metrology institute to the end user. By shortening the dissemination chain, calibration laboratories can improve the accuracy of their measurements. The second generation NIST Kibble balance 200 is also user-friendly, robust, and ergonomic such that it is easy to use, durable, and comfortable to operate. The second generation NIST Kibble balance 200 also has a short measurement time, which makes it a more efficient option for calibration laboratories. The low uncertainty of the second generation NIST Kibble balance 200 relaxes the demand for direct connection to quantum electrical standards, gravimeters, and vacuum environments. These are typically required for more accurate measurements. However, the second generation NIST Kibble balance 200 is capable of providing accurate measurements without these requirements. This makes the second generation NIST Kibble balance 200 a more versatile and cost-effective option for calibration laboratories.

Second generation NIST Kibble balance 200 determines an absolute mass. In an embodiment, with reference to FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, and FIG. 18, second generation NIST Kibble balance 200 includes: main body 201 that provides a stationary platform: for displacement motion of measurement mass arm 249 and reference force arm 250 relative to main body 201 and for pivotal motion of lever bar 251 relative to main body 201, main body 201 including main body fulcrum node 252 that is a fixed pivot for lever bar 251; lever bar 251 in mechanical communication with main body 201 and that pivots about main body fulcrum node 252 and including lever bar attachment node 253, such that lever bar 251 is suspended from main body 201 by central flexural bridge 216 disposed on lever bar 251 at lever bar attachment node 253 and pivotally moves to restore mass balance between measurement mass arm 249 and reference force arm 250; central flexural bridge 216 in flexural mechanical communication with main body 201 and lever bar 251, such that central flexural bridge 216: is disposed on main body 201 at main body fulcrum node 252, is interposed between main body 201 and lever bar 251, and flexes in response to pivotal motion of lever bar 251 relative to main body 201; measurement mass arm 249 disposed proximate to and mechanically coupled to main body 201 via lever bar 251, central flexural bridge 216, and mass arm flexural bridge 215, measurement mass arm 249 including mass arm attachment node 254; mass arm flexural bridge 215 in flexural mechanical communication with measurement mass arm 249 and lever bar 251, such that mass arm flexural bridge 215: is disposed on measurement mass arm 249 at mass arm attachment node 254, is interposed between measurement mass arm 249 and lever bar 251, and flexes in response to pivotal motion of lever bar 251 relative to main body 201; reference force arm 250 arm disposed proximate to and mechanically coupled to main body 201 via lever bar 251, central flexural bridge 216, and reference arm flexural bridge 217, reference force arm 250 including reference arm attachment node 255, such that reference force arm 250 moves in counter-linear motion to measurement mass arm 249; and reference arm flexural bridge 217 in flexural mechanical communication with reference force arm 250 and lever bar 251, such that reference arm flexural bridge 217: is disposed on reference force arm 250 at reference arm attachment node 255, is interposed between reference force arm 250 and lever bar 251, and flexes in response to pivotal motion of lever bar 251 relative to main body 201.

In an embodiment, lever bar 251 includes lever-to-mass arm attachment node 256 that interconnects lever bar 251 and mass arm flexural bridge 215. In an embodiment, measurement mass arm 249 is suspended from lever bar 251 by mass arm flexural bridge 215 disposed on lever bar 251 at lever-to-mass arm attachment node 256.

In an embodiment lever bar 251 includes lever-to-reference arm attachment node 257 that interconnects lever bar 251 and reference arm flexural bridge 217. In an embodiment, reference force arm 250 is suspended from lever bar 251 by reference arm flexural bridge 217 disposed on lever bar 251 at lever-to-reference arm attachment node 257.

In an embodiment, second generation NIST Kibble balance 200 includes a first mass pan 205.1 disposed on measurement mass arm 249 and receives first mass 207.1 for determination of an absolute mass of first mass 207.1. In an embodiment, second generation NIST Kibble balance 200 includes second mass pan 205.2 disposed on reference force arm 250 and that receives second mass 207.2.

In an embodiment, second generation NIST Kibble balance 200 includes displacement sensor 204 disposed on measurement mass arm 249 and that determines a displacement of measurement mass arm 249 relative to main body 201. In an embodiment, second generation NIST Kibble balance 200 includes actuator 202 disposed on measurement mass arm 249 and that produces a force to counteract the force of gravity on measurement mass arm 249. In an embodiment, second generation NIST Kibble balance 200 includes electronic analyzer 213 in electrical communication with actuator 202 and that receives balance signal 214 from actuator 202, produces mass arm feedback signal 258 to control actuator 202, and produces absolute mass signal 261 for mass 207 disposed on measurement mass arm 249.

In an embodiment, second generation NIST Kibble balance 200 includes electromagnet 203 disposed on reference force arm 250 and that produces a force to counteract the force of gravity on reference force arm 250. In an embodiment, second generation NIST Kibble balance 200 includes electronic analyzer 213 in electrical communication with electromagnet 203 and that receives reference arm signal 259 from electromagnet 203, produces reference arm feedback signal 260 to control electromagnet 203, and produces absolute mass signal 261 for mass 207 disposed on measurement mass arm 249.

In an embodiment, second generation NIST Kibble balance 200 includes flexure stiffness tuner 206 disposed on main body 201 to adjust a range of pivotal motion of lever bar 251 relative to main body 201.

In an embodiment, second generation NIST Kibble balance 200 includes sacrificial bridge 218 disposed on main body 201 to interconnect and immobilize measurement mass arm 249, reference force arm 250, or lever bar 251 relative to main body 201.

In an embodiment, actuator 202 includes an electromagnetic or a capacitor.

In an embodiment, second generation NIST Kibble balance 200 includes electronic analyzer 213 in electrical communication with actuator 202 and that optionally receives balance signal 214 from actuator 202, optionally communicates mass arm feedback signal 258 to actuator 202 to control actuator 202, and produces absolute mass signal 261 for mass 207 from balance signal 214. In an embodiment, second generation NIST Kibble balance 200 includes electronic analyzer 213 in electrical communication with electromagnet 203 and that optionally receives reference arm signal 259 from electromagnet 203, optionally communicates reference arm feedback signal 260 to electromagnet 203 to control electromagnet 203, and produces absolute mass signal 261 for mass 207 from balance signal 214 or reference arm signal 259.

Figure 11:
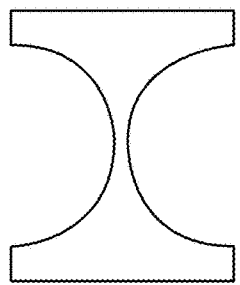
FIG. 11 shows, according to some embodiments, several views and flexion of a flexural bridge: (A) in a front view, (B) in a perspective view, (C) with a dummy platform (to stand in for the main body) disposed on a top surface of the flexural bridge such that the length axis of the dummy platform is aligned with the axis of flexion of the flexural bridge, (D) for flexion of the flexural bridge in response to an on-axis-of-flexion force subjected to the dummy platform and transmitted to the flexural bridge, (E) with a dummy platform (to stand in for the main body) disposed on a top surface of the flexural bridge such that the length axis of the dummy platform is orthogonal to the axis of flexion of the flexural bridge, and (F) for resistance to flexion of the flexural bridge in response to an off-axis-of-flexion force subjected to the dummy platform and transmitted to the flexural bridge.
Figure 11:
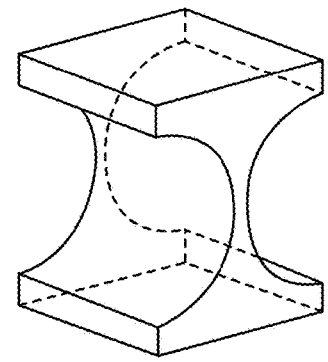
Figure 11:
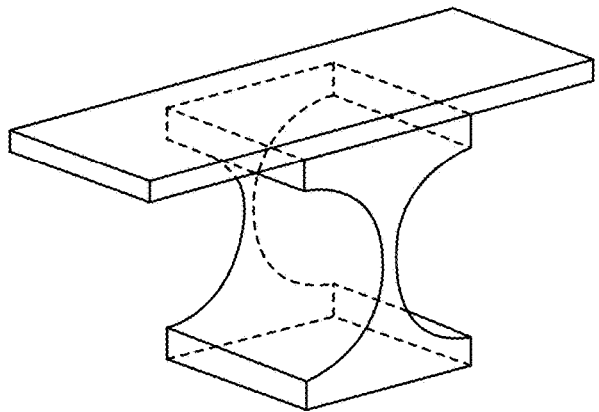
Figure 11:
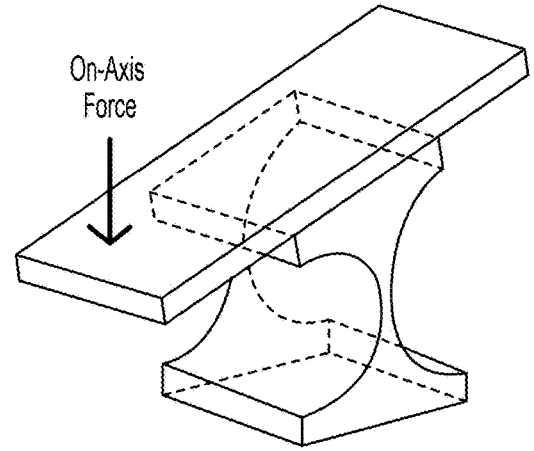
Figure 11:
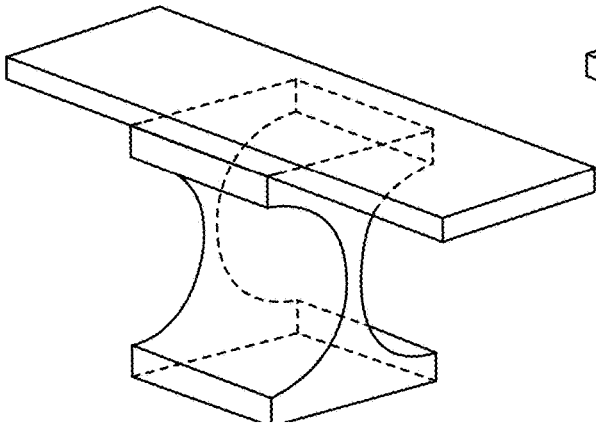
Figure 11:
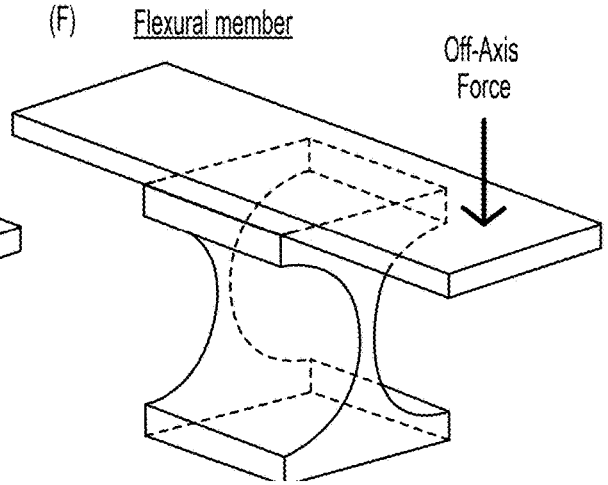
Figure 12:
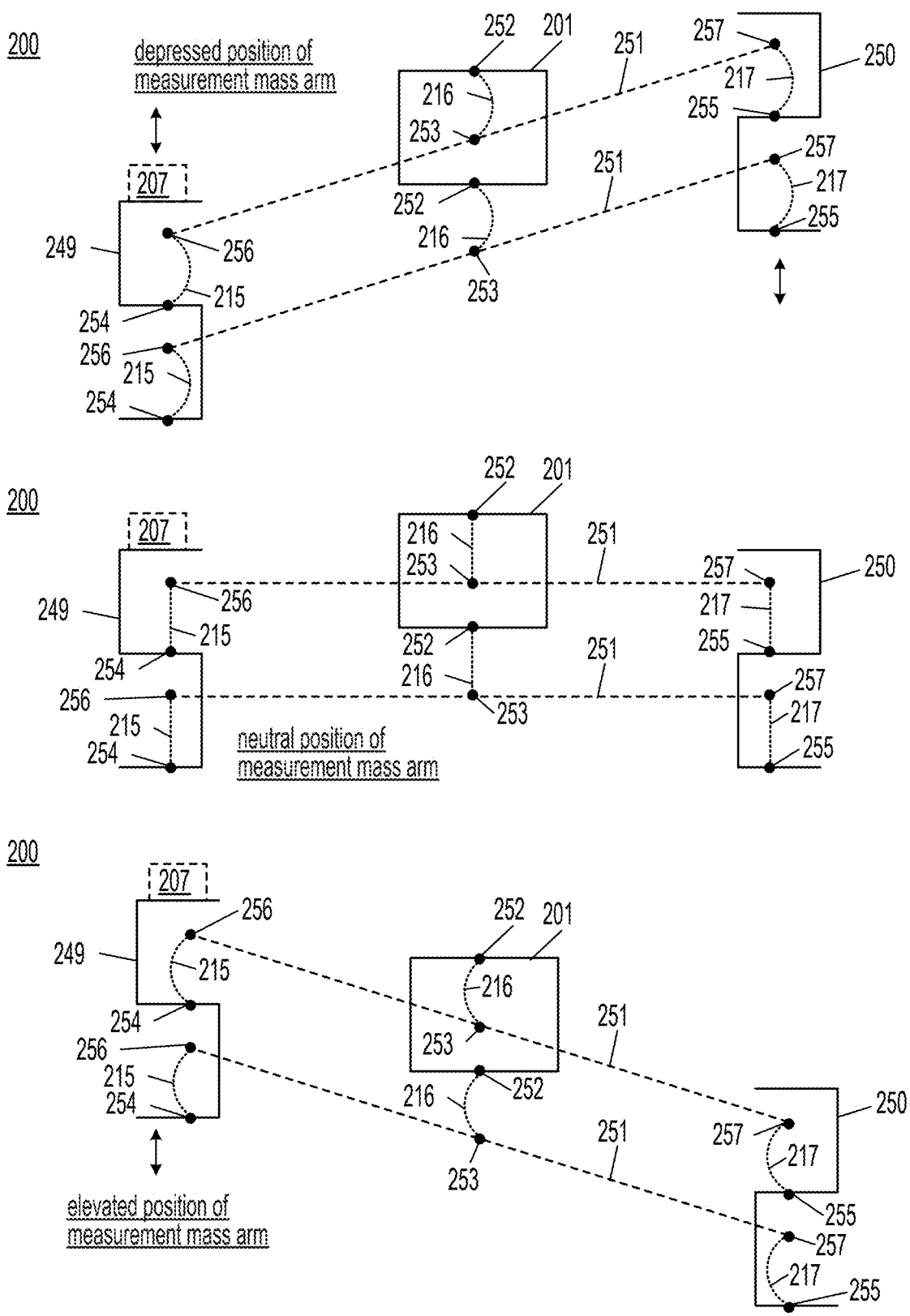
FIG. 12 shows, according to some embodiments, a second generation NIST Kibble balance 200, wherein: (A) flexural bridges (215, 216, 217) are subjected to flexion due to motion of lever bar 251 relative to the main body 201 such that the measurement mass arm 249 attains a depressed position relative to its neutral position (wherein a greater force is subjected to the measurement mass arm 249 than the reference force arm 250), (B) flexural bridges (215, 216, 217) are not in flexion such that the measurement mass arm 249 and the reference force arm 250 are in their neutral positions (wherein equivalent forces occur at the measurement mass arm 249 and the reference force arm 250), and (C) flexural bridges (215, 216, 217) are subjected to flexion due to motion of lever bar 251 relative to the main body 201 such that the measurement mass arm 249 attains an elevated position relative to its neutral position (wherein a greater force is subjected to the reference force arm 250 than the measurement mass arm 249).

Relative motion of measurement mass arm 249, reference force arm 250, lever bar 251 and main body 201 occurs via flexural bridges (215, 216, 217), wherein flexion is restricted to two dimensions by flexural bridges (215, 216, 217) that bend on one axis, the flexural axis of a respective flexural bridge, e.g., as shown in the several views of FIG. 11. Accordingly, flexural bridges (215, 216, 217) provide nearly linear motion instead of unconstrained motion in all three dimensions. Additionally, mass pan 205 holds mass 207 (e.g., a physical object) being weighed. Actuator 202 or electromagnet 203 can include an electromagnetic (EM) coil disposed on opposing ends of main body 201. Magnets provide a magnetic field through which the electromagnetic coils move. Displacement sensor 204 can be an optical encoder or interferometer, wherein such detects light and converts it into electrical signals from which is determined the movement of the coil. In particular, a laser interferometer uses wavelengths of light to determine distance with high accuracy and measures the position and movement of the coil. Electronics measure an induced voltage in velocity mode or electrical current applied in a weighing mode.

In an embodiment, second generation NIST Kibble balance 200 has operates in a velocity mode or a force mode. Velocity mode is based on Faraday's law of induction, wherein a coil of wire with length l is moved through a magnetic field B, so that a voltage is induced. Force mode is based on the Lorentz force, wherein the gravitational force on a mass is counteracted by an electromagnetic force generated by the same coil, energized with current i in the same magnetic field. In an embodiment, e.g., with reference to FIG. 11, flexural bridges (215, 216, 217) provide constrained flexion for motion in a single degree of freedom in second generation NIST Kibble balance 200, and main body 201 provides a bulkhead on which to dispose other elements of second generation NIST Kibble balance 200. Moreover, flexure stiffness tuner 206 can be adjusted to reduce stiffness of flexural bridges (215, 216, 217). Flexural bridges (215, 216, 217) can be maintenance-free, have negligible hysteresis, and have reproducible motion.

For measurements of small forces, either a low external magnetic field or a short length of wire in the electromagnetic force generator can be used. In either case, the induced voltage in the velocity mode tends to be small for sensing and difficult to measure with low uncertainty. A larger Bl product can be used and involves measurement of a very small electrical current during force mode, making the input current difficult to measure with low uncertainty. These technical barriers are overcome by second generation NIST Kibble balance 200. In this aspect, second generation NIST Kibble balance 200 includes an electrostatic force from a reference capacitor that provides traceability to Planck's constant using electrical metrology (voltage, V, and capacitance, C) and a displacement sensing (position z), wherein electrostatic force is $$F = \frac{1}{2}\frac{dC}{dz}V^2.$$

The capacitance gradient may be measured by changing position using the force from a voltage applied to the capacitor during the capacitance measurement or by using an electromagnet to provide the force to change position during the capacitance measurement. The capacitor is used directly in this configuration as a reference for measurement of low mass and force. This force reference capacitor can also be operated concurrently with the electromagnet on the same mechanism and using the same displacement sensor to measure z. In this case, balancing the electromagnetic and electrostatic forces yields $$Bli = \frac{1}{2}\frac{dC}{dz}V^2.$$

Figure 2:
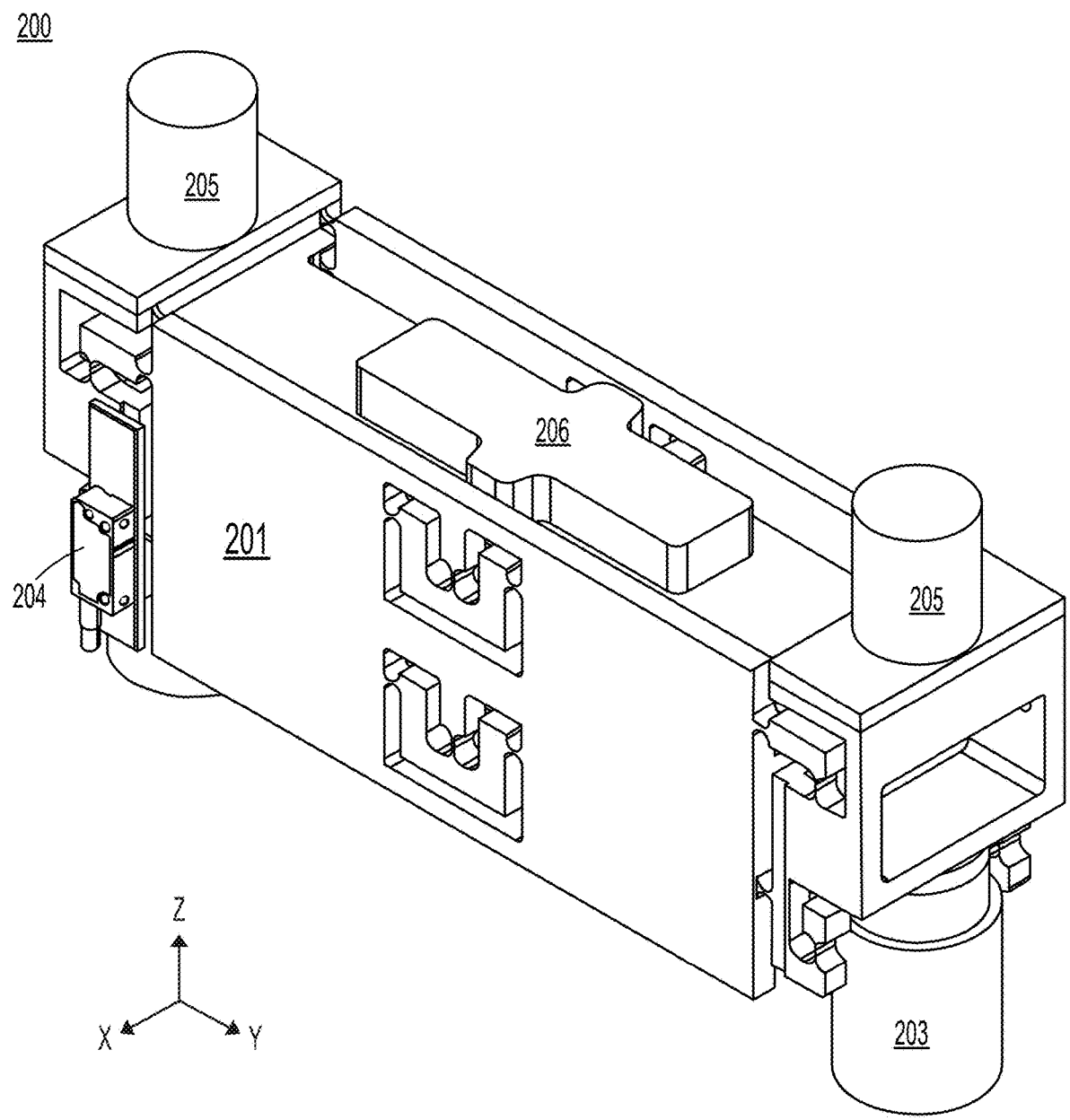
FIG. 2 shows, according to some embodiments, a perspective view of a second generation NIST Kibble balance 200.
Figure 3:
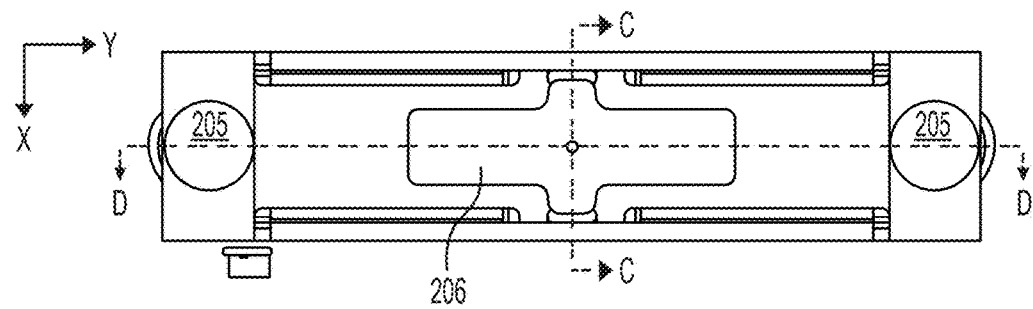
FIG. 3 shows, according to some embodiments: (A) a top view, (B) a cross-section along line C-C shown in panel A, and (C) a cross-section along line D-D shown in panel A for the second generation NIST Kibble balance 200 shown in FIG. 2.
Figure 3:
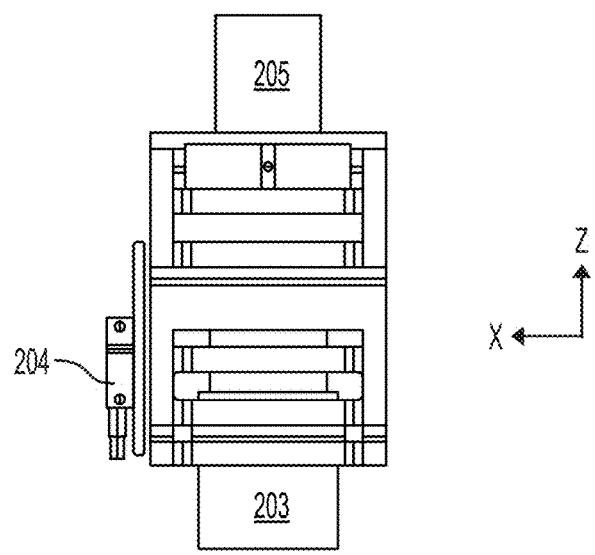
Figure 3:
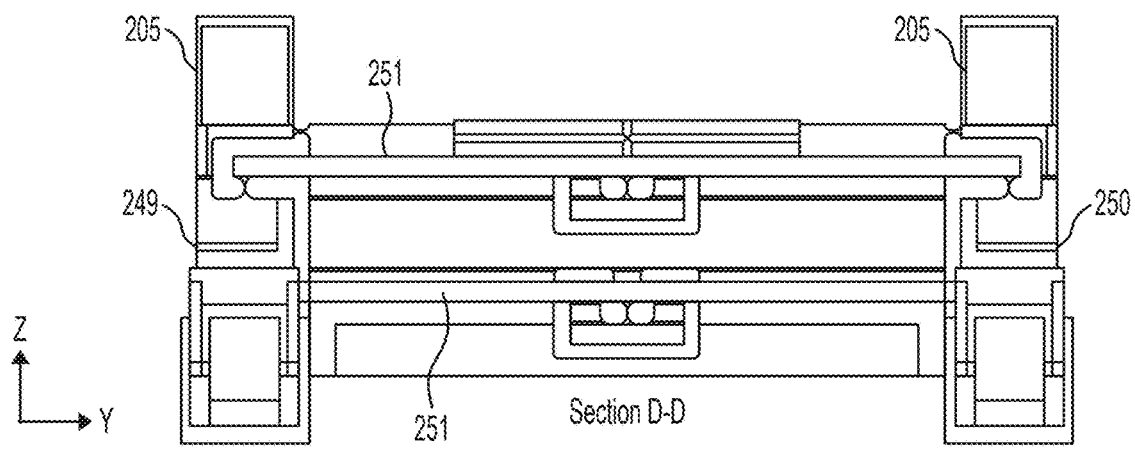
Figure 4:
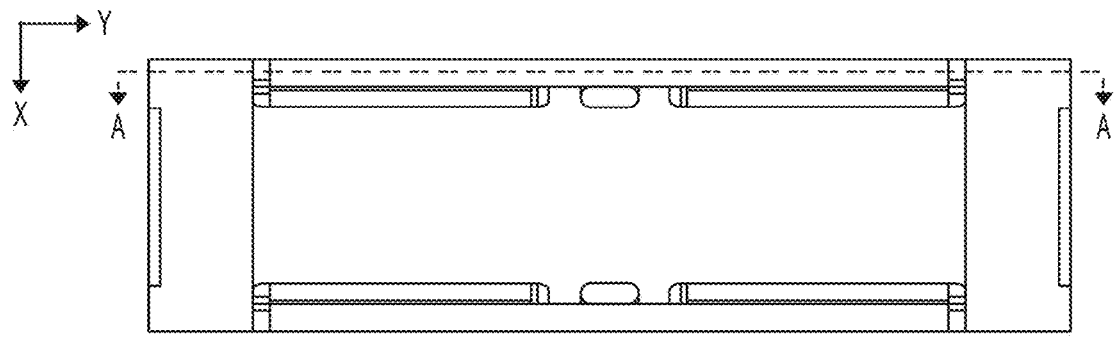
FIG. 4 shows, according to some embodiments: (A) a view of the second generation NIST Kibble balance 200 shown in FIG. 2, and (B) a cross-section along line A-A shown in panel A, wherein sacrificial bridges are present to immobilize motion of a measurement mass arm 249, a reference force arm 250, and a lever bar 251 relative to a main body 201.
Figure 4:
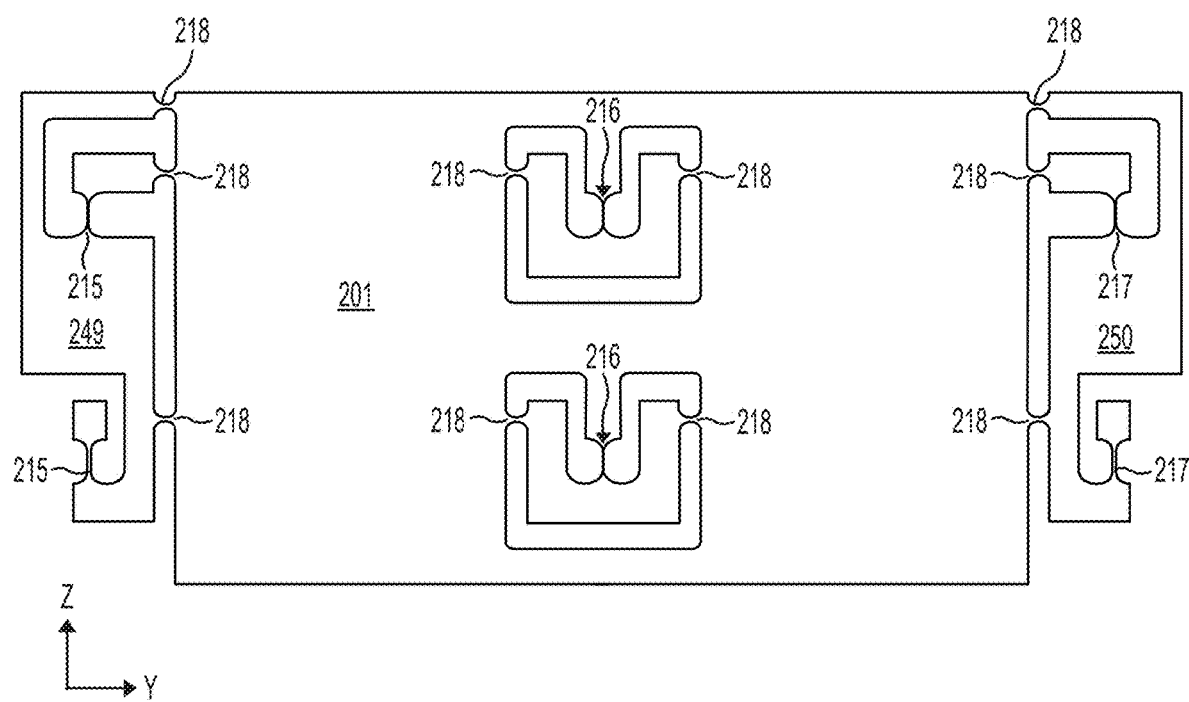
Figure 5:
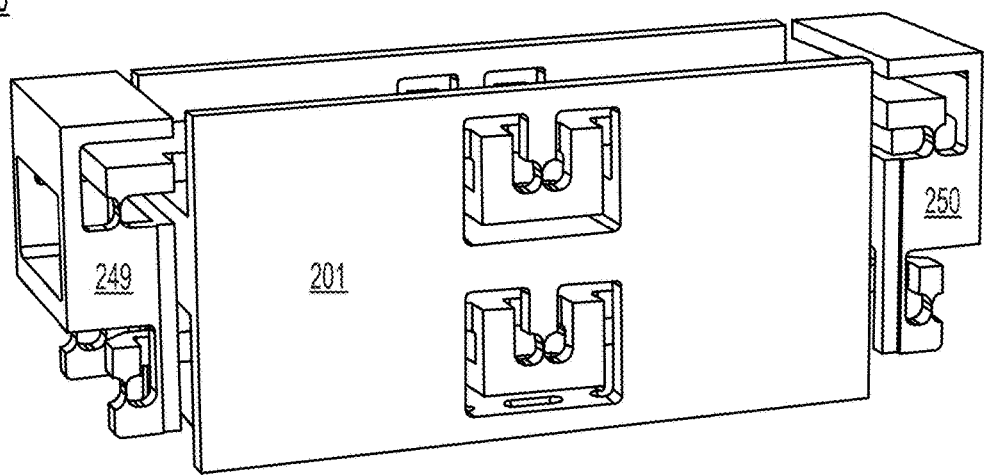
FIG. 5 shows, according to some embodiments: (A) a perspective view of the second generation NIST Kibble balance 200 shown in FIG. 2, (B) a top view, and (C) a cross-section along line B-B shown in panel B.
Figure 5:
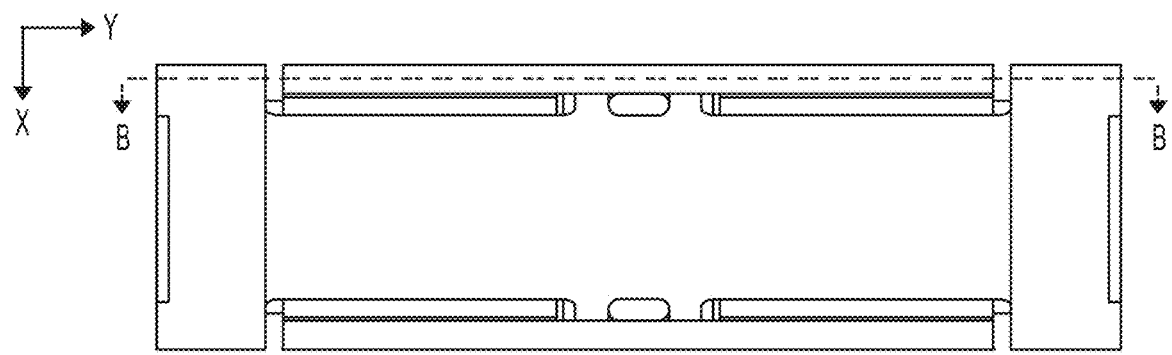
Figure 5:
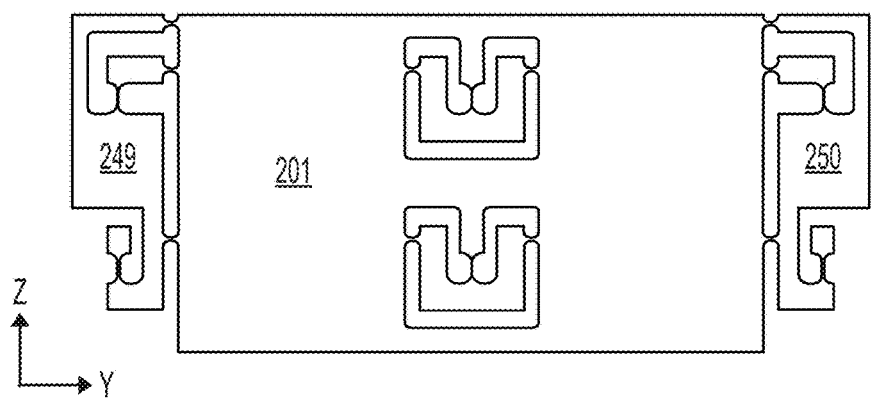

The construction of the external magnetic field and electromagnet can be optimized for the lowest uncertainty during weighing mode for smaller masses and forces. As a result, second generation NIST Kibble balance 200 provides multiple different electromagnet configurations to be implemented. In an embodiment, the force reference capacitor is disposed proximate to one end of main body 201, and an electromagnetic actuator is disposed on the opposing end of main body 201, as shown in FIG. 2. In an embodiment, electromagnetic actuators are disposed at both ends of main body 201 such that one actuator mechanically is linked to the force reference capacitor. Such electromagnetic actuators can have integrated taps at known numbers of turns, providing different force ranges to quantify linearity over the different mass and force operating ranges of the system.

Second generation NIST Kibble balance 200 can be made of various elements and components that are fabricated or off-the-shelf and that can be various sizes or shapes. Elements of second generation NIST Kibble balance 200 can be made of a material that is physically or chemically resilient in an environment in which second generation NIST Kibble balance 200 is disposed. Exemplary materials include a metal, ceramic, thermoplastic, glass, semiconductor, and the like. The elements of second generation NIST Kibble balance 200 can be made of the same or different material and can be monolithic in a single physical body or can be separate members that are physically joined.

Flexural bridges (215, 216, 217) involve elastic deformation of a formed material to guide the motion of an element in a particular trajectory. Flexural bridges (215, 216, 217) can be made from a metallic material such as aluminum, copper, brass, or steel, an insulating material such as ceramic, glass, or fused silica, a semiconducting material such as silicon or gallium arsenide, or a hybrid of multiple materials. Flexural bridges (215, 216, 217) provide an approximately linear motion of electromagnet 203, displacement sensor 204, or mass pan 205 in a direction parallel to gravity. Central flexural bridge 216 provide a center of rotation about which the rotating elements of the mechanism of the flexure rotate. Mass arm flexural bridge 215 provides attachment to translating elements of measurement mass arm 249 to constrain their motion to be approximately linear. Reference arm flexural bridge 217 provides directional constraint on the opposite side of main body 201 for reference force arm 250.

Figure 13:
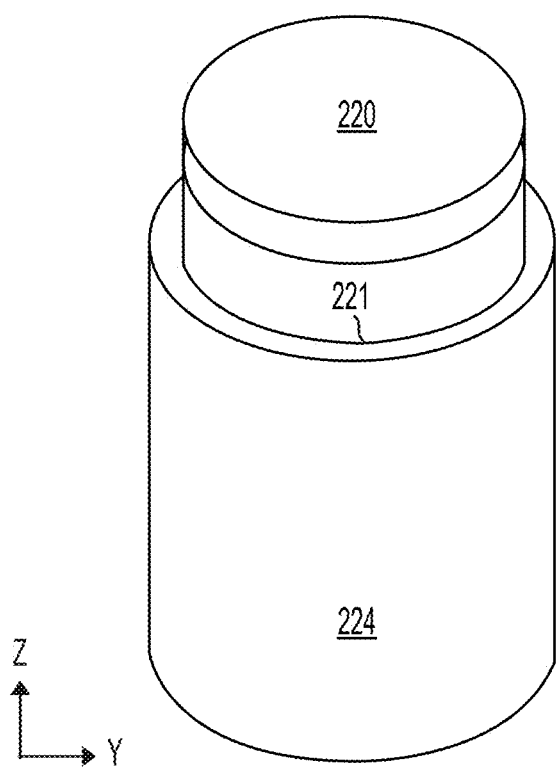
FIG. 13 show, according to some embodiments: (A) a perspective view of an electromagnet for an actuator 202 of a second generation NIST Kibble balance 200 and (B) a cross-section of the electromagnet.
Figure 13:
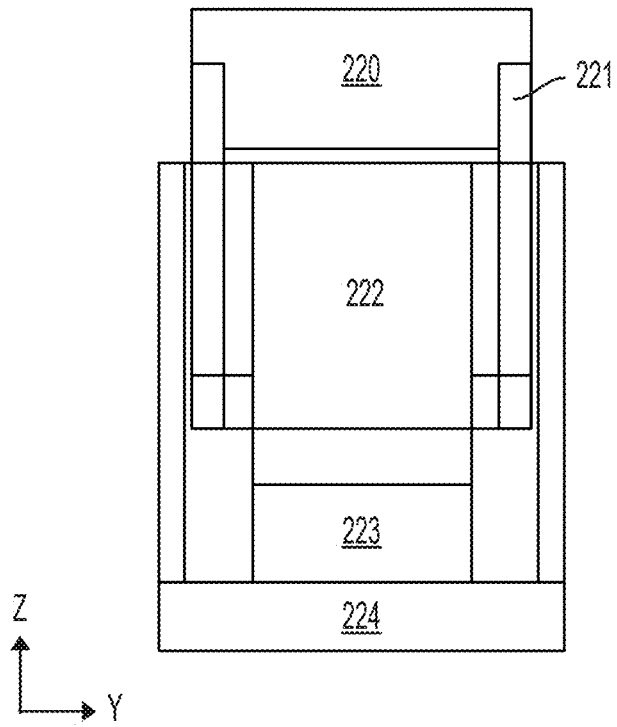
Figure 14:
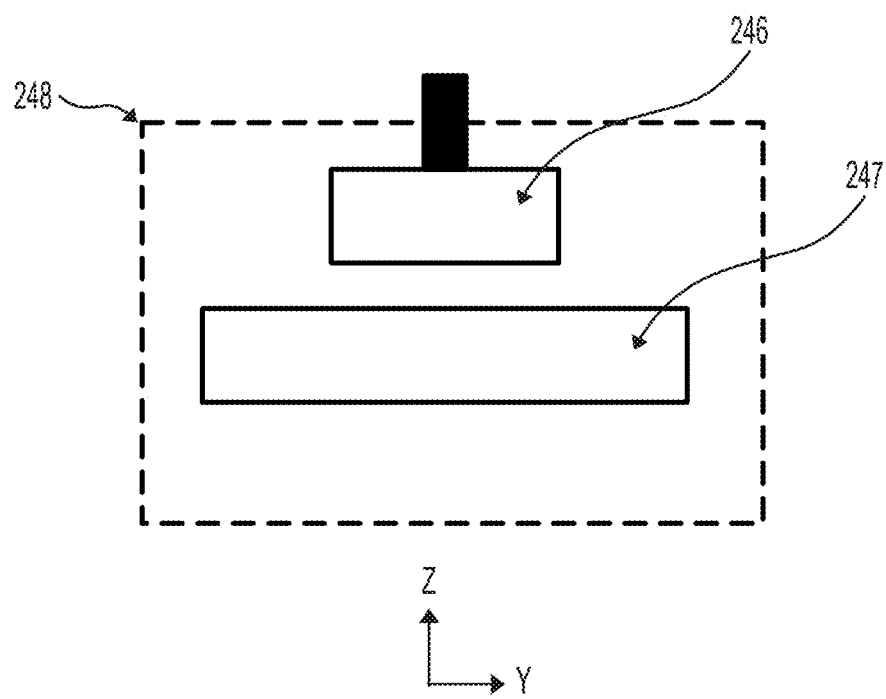
FIG. 14 shows, according to some embodiments: (A) a cross section of an actuator 202 for a second generation NIST Kibble balance 200 that includes a capacitor with spaced apart electrodes and (B) a perspective view of the capacitor.
Figure 14:
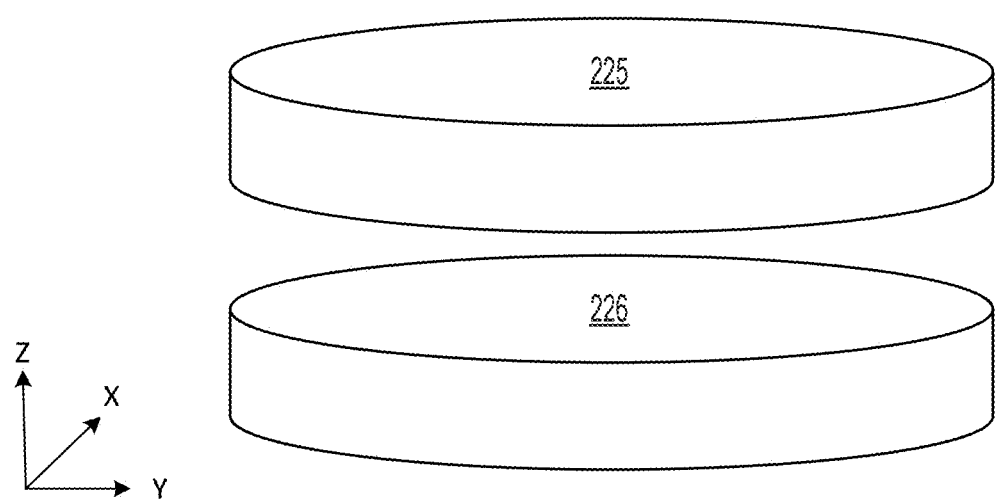
Figure 15:
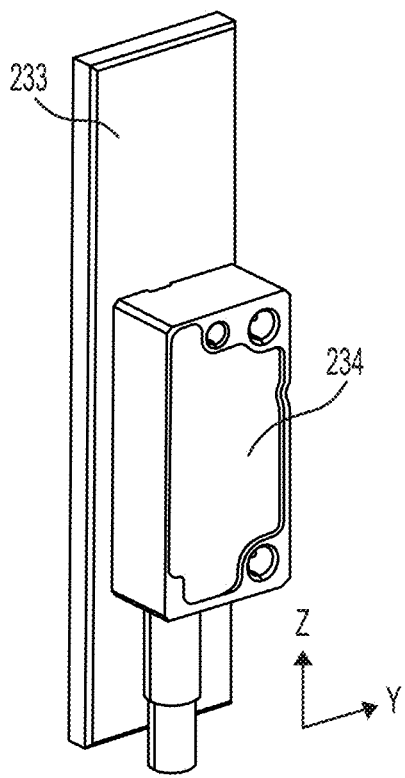
FIG. 15 shows, according to some embodiments: (A) a perspective view of an optical encoder as a displacement sensor 204 of a second generation NIST Kibble balance 200 and (B) an interferometer as the displacement sensor 204 for the second generation NIST Kibble balance 200.
Figure 15:
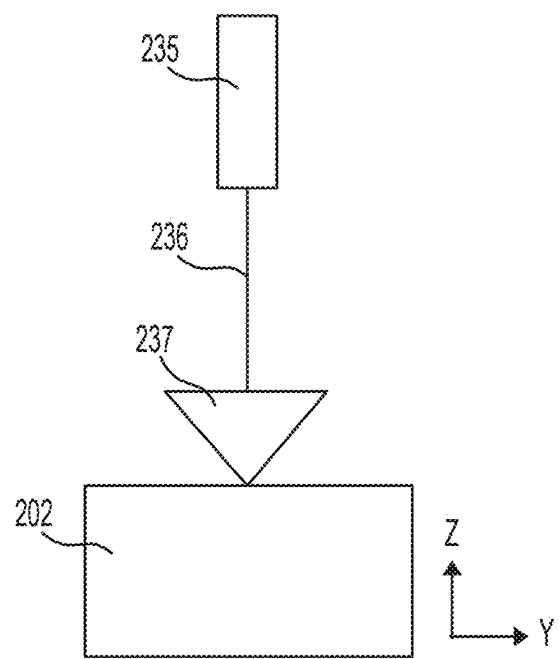

With reference to FIG. 13 and FIG. 14, actuator 202 can be an electromagnet or a capacitor that produces an electrostatic force between the movable electrode 246 and stationary electrode 247 when a voltage is applied. Flexural bridges can be subjected to flexion to produce movement of lever bar 251, or another modality for applying a force to either the flexural bridges or the electromagnet can be provided. The capacitor can be constructed in several geometries, including two flat electrodes, a spherical and a flat electrode, a pair of electrodes forming concentric cylinders and others. The electrodes can be disposed in electrode shield 248 that is configured to control the electrical field between movable electrode 246 and stationary electrode 247. Movable electrode 246, stationary electrode 247, and electrode shield 248 can be formed from electrically conductive material such as aluminum, copper, brass, gold, or a combination of conductive materials.

With reference to FIG. 13, inner magnet yoke 222 and outer magnet yoke 224 of an electromagnet for actuator 202 can be a material suitable to form the magnetic field into a selected shape and can be, e.g., iron or another ferromagnetic material.

Displacement sensor 204 transduces motion or position of flexural bridges (215, 216, 217), the electromagnet, or actuators 203 into an electronic signal. An optical encoder does this by reading out a reference encoder scale 233 using the encoder readerhead 234. An interferometer does this by measuring optical interference of a laser beam 235 produced by a laser head 235 passing through interferometer optics 237 and laser head 235.

Mass pan 205 provides a defined location to dispose mass 207 to be measured and is connected to mass arm flexural bridge 215, reference arm flexural bridge 217, electromagnet 203, or actuator 202. Mass pan 205 can include of mass pan platform 240 connected to mass pan base 242 that is connected to mass pan cylinder 241. Mass pan 205 can be made of a metallic material such as aluminum, copper, brass, and the like or a composite material.

Flexure stiffness tuner 206 changes the stiffness of flexural bridges (215, 216, 217) or provides a counterweight to align the center of mass of flexural bridges (215, 216, 217) to a central pivot point. Coarse inverted mass 243 is an inverted pendulum that changes the stiffness of flexural bridges (215, 216, 217). Mounting hole 244 is a point of attachment and adjustability for the Z-mass. Mounting hole 245 is an attachment point and adjustability for the Y-mass. Both the Z- and Y-masses can be manually or automatically adjusted in position.

Electronic analyzer 213 provides communication with, analysis of, production of, or control of signals (e.g., balance signal 214, mass arm feedback signal 258, reference arm signal 259, reference arm feedback signal 260, for displacement sensor 204, actuator 202, electromagnet 203, and the like via, e.g., balance signal 214. Analyzer 213 can also produce absolute mass signal 261 that can be displayed as a number, graph, and the like, or used an electrical signal of the absolute mass of mass 207.

Second generation NIST Kibble balance 200 can be made in various ways. It should be appreciated that second generation NIST Kibble balance 200 includes a number of optical, electrical, or mechanical components, wherein such components can be interconnected and placed in communication (e.g., optical communication, electrical communication, mechanical communication, and the like) by physical, chemical, optical, or free-space interconnects. The components can be disposed on mounts that can be disposed on a bulkhead for alignment or physical compartmentalization. As a result, second generation NIST Kibble balance 200 can be disposed in a terrestrial environment or space environment. According to an embodiment, the elements of second generation NIST Kibble balance 200 are formed by machining a stock material such as block of material that is subjected to removal of material such as by cutting, laser oblation, and the like. Accordingly, second generation NIST Kibble balance 200 can be made by additive or subtractive manufacturing.

In an embodiment, a process for making includes various steps, wherein components for flexural bridges (215, 216, 217) are fabricated such that any mobile elements are immobilized by sacrificial bridges; the actuator, electromagnet, displacement sensor, mass pan, flexure stiffness tuner, interferometer optics, any fasteners, and wiring for the balance signal to communicate with the electronic analyzer are attached to the flexure member; the sacrificial bridges are removed; and the flexure stiffness tuner is adjusted to the appropriate level.

Second generation NIST Kibble balance 200 has numerous advantageous and unexpected benefits and uses. In an embodiment, a process for determining absolute mass includes: providing second generation NIST Kibble balance 200 including: main body 201 and including main body fulcrum node 252; lever bar 251 in mechanical communication with main body 201 and that pivots about main body fulcrum node 252; central flexural bridge 216 in flexural mechanical communication with main body 201 the lever bar 251; measurement mass arm 249 mechanically coupled to the main body 201 via lever bar 251, the central flexural bridge 216, and mass arm flexural bridge 215; the mass arm flexural bridge 215 in flexural mechanical communication with the measurement mass arm 249 and the lever bar 251; a reference force arm 250 arm mechanically coupled to the main body 201 via the lever bar 251, the central flexural bridge 216, and a reference arm flexural bridge 217; and the reference arm flexural bridge 217 in flexural mechanical communication with the reference force arm 250 and the lever bar 251; discretely pivoting, by the electromagnet 203, the lever bar 251 relative to the main body 201 over a plurality of different displacements of the measurement mass arm 249; determining a capacitance gradient dC/dZ as a function of the different displacements of the measurement mass arm 249 that occurs from discretely pivoting the lever bar 251 relative to the main body 201; fixing a moving electrode of the actuator 202 at a specific position determined by the displacement sensor 204; receiving the mass 207 on the mass pan 205 of the measurement mass arm 249; measuring a first change in voltage required by the actuator 202 to maintain the specific position; removing the mass 207 from the mass pan 205; measuring a second change in voltage required by the actuator 202 to maintain the specific position; and calculating the absolute mass of the mass 207 from the first change in voltage, the second change in voltage, and the capacitance gradient dC/dZ. In an embodiment, the absolute mass of mass 207 is less than or equal to 100 milligrams.

In an embodiment, a process for determining absolute mass, includes providing a second generation NIST Kibble balance 200 including: main body 201 and including main body fulcrum node 252; a lever bar 251 in mechanical communication with the main body 201 and that pivots about the main body fulcrum node 252; a central flexural bridge 216 in flexural mechanical communication with the main body 201 and the lever bar 251; a measurement mass arm 249 mechanically coupled to the main body 201 via the lever bar 251, the central flexural bridge 216, and a mass arm flexural bridge 215; the mass arm flexural bridge 215 in flexural mechanical communication with the measurement mass arm 249 and the lever bar 251; a reference force arm 250 arm mechanically coupled to the main body 201 via the lever bar 251, the central flexural bridge 216, and a reference arm flexural bridge 217; and the reference arm flexural bridge 217 in flexural mechanical communication with the reference force arm 250 and the lever bar 251; oscillating, by the electromagnet 203, the lever bar 251 relative to the main body 201 to produce oscillatory linear displacements of the measurement mass arm 249; calibrating an electromagnet of the actuator 202 as a function of the oscillatory linear displacements of the measurement mass arm 249; determining a BL product of the actuator 202 after calibrating the electromagnet of the actuator 202; fixing the actuator 202 at a specific position determined by the displacement sensor 204; receiving the mass 207 on the mass pan 205 of the measurement mass arm 249; measuring a first change in voltage required by the actuator 202 to maintain the specific position; removing the mass 207 from the mass pan 205; measuring a second change in voltage required by the actuator 202 to maintain the specific position; and calculating the absolute mass of the mass 207 from the first change in voltage, the second change in voltage, and the BL product. In an embodiment, the absolute mass of mass 207 is greater than or equal to 100 milligrams and less than or equal to 10 grams.

In an embodiment, a mode of operation of is velocity mode. Velocity mode is based on the principle of Faraday's law of induction. A coil of wire with length l is moved through a magnetic field B, so that a voltage is induced. In an embodiment, a mode of operation of is force mode. Force mode is based on the Lorentz force. The gravitational force on a mass is counteracted by an electromagnetic force generated by the same coil, now energized with a current, i, in the same magnetic field. In an embodiment, a mode of operation of second generation NIST Kibble balance 200 is capacitance gradient mode. Capacitance gradient mode in which one or both capacitor electrodes are moved by the balance mechanism to determine the gradient of capacitance with respect to the direction of gravitational acceleration or another trajectory. In an embodiment, a mode of operation of second generation NIST Kibble balance 200 is electrostatic mode, that can include positioning the movable electrode at specific positions defined by the readout to generate a force.

The force reference capacitor actuator can be used to calibrate the force measurement of the actuator. Alternatively, the electromagnet can be used to calibrate the force reference capacitor or actuator to measure mass.

In an embodiment, the electromagnet operates second generation NIST Kibble balance 200 as a Kibble balance such that measurements of voltage, velocity, position, and current are used to determine electromagnetic force applied to balance mass 207, and along with local gravitational acceleration, provide a direct realization of the value of the reference mass's mass traceable to the International System of Units (SI).

In an embodiment, the force reference capacitor actuator is used to operate second generation NIST Kibble balance 200 as an electrostatic force balance, wherein measurements of voltage, position and capacitance are used to determine electrostatic force applied to balance mass 207, and along with local gravitational acceleration, provide a direct realization of the value of the reference mass's mass traceable to the SI.

In an embodiment, the force reference capacitor actuator is used to operate second generation NIST Kibble balance 200 as an electrostatic force balance, wherein measurements of voltage, position and capacitance are used as a means to calibrate the BL product of the electromagnet or actuator. The electromagnet or actuator are then used to determine electromagnetic force applied to balance a reference mass, and along with local gravitational acceleration, provide a direct realization of the value of the reference mass's mass traceable to the SI.

In an embodiment, the force reference capacitor actuator, electromagnet, or actuator are used simultaneously to operate second generation NIST Kibble balance 200 as a hybrid Kibble-electrostatic force balance, wherein measurements of voltage, position and capacitance are used as a means to determine electrostatic force applied to balance and measurements of voltage, velocity, position and current are used as a means to determine electromagnetic force applied to balance. The electromagnet, actuator, or capacitor is used to determine combined force applied to balance mass 207, and along with local gravitational acceleration, provide a direct realization of the value of the mass of mass 207 traceable to the SI.

It is contemplated that second generation NIST Kibble balance 200 and determining absolute mass can include the properties, functionality, hardware, and process steps described herein and embodied in any of the following non-exhaustive list:

a process (e.g., a computer-implemented method including various steps; or a method carried out by a computer including various steps);

an apparatus, device, or system (e.g., a data processing apparatus, device, or system including means for carrying out such various steps of the process; a data processing apparatus, device, or system including means for carrying out various steps; a data processing apparatus, device, or system including a processor adapted to or configured to perform such various steps of the process);

a computer program product (e.g., a computer program product including instructions which, when the program is executed by a computer, cause the computer to carry out such various steps of the process; a computer program product including instructions which, when the program is executed by a computer, cause the computer to carry out various steps);

computer-readable storage medium or data carrier (e.g., a computer-readable storage medium including instructions which, when executed by a computer, cause the computer to carry out such various steps of the process; a computer-readable storage medium including instructions which, when executed by a computer, cause the computer to carry out various steps; a computer-readable data carrier having stored thereon the computer program product; a data carrier signal carrying the computer program product);

a computer program product including comprising instructions which, when the program is executed by a first computer, cause the first computer to encode data by performing certain steps and to transmit the encoded data to a second computer; or a computer program product including instructions which, when the program is executed by a second computer, cause the second computer to receive encoded data from a first computer and decode the received data by performing certain steps.

The articles and processes herein are illustrated further by the following Example, which is non-limiting.

Example

The design and development of the second generation tabletop Kibble balance at NIST 1. Opening The redefinition of the international system of units (SI) shifts the definition of the unit of mass, the kilogram, from a physical artifact to the fixed value of the Planck constant. Utilizing the new SI, mass measurements can be carried out with Kibble balances (KB) which directly realize mass through electromagnetic force measurements ultimately traceable to quantum electrical standards. Recently, calibrations laboratories and metrology institutes have shown interest in directly measuring gram-level masses with a tabletop KB with uncertainties similar to that of International Organization of Legal Metrology (OIML) class E2 weights typically used for calibrating commercial mass comparators. For example, E2 weights from 1 g to 5 g have relative uncertainties from $5 \times 10^{-6}$ to $2 \times 10^{-6}$, respectively. Building a KB at this level of uncertainty relaxes the demand for direct connection to quantum electrical standards, gravimeters, and high vacuum environments required for more accurate KBs and was proven with KIBB-g1, a first generation tabletop KB capable of directly realizing gram-level masses in air with uncertainties on the order of $10^{-6}$. The second generation tabletop KB, KIBB-g2, can have, e.g., a dynamic range of 500 mg to 50 g with slightly looser uncertainties of $3 \times 10^{-5}$ and focuses strongly on optimizing usability, robustness, ergonomics, and measurement time, to meet commercial requirements for a ubiquitous weighing device. Here, we describe the recent design and developments of the KIBB-g2 tabletop KB.

Gram-level mass determinations have historically been realized via subdividing through a convoluted dissemination chain ultimately traceable to a primary kilogram standard. A tabletop version of an instrument known as the Kibble balance (KB) allows for calibrations labs to truncate this traceability chain and directly realize gram-level masses on site with an alternate path of traceability to voltage and resistance standards. Such an instrument, KIBB-g1, was built as a proof of principle.

It is compulsory for calibrations laboratories to regularly calibrate their mass sets by physically shipping them to primary laboratories, such as the National Institute of Standards and Technology (NIST). This infrastructure is a logistically and financially inefficient, time consuming process. The second generation tabletop Kibble balance, KIBB-g2, can directly realize masses ranging from [500 mg-50 g] with uncertainties on the order of $3 \times 10^{-5}$. KIBB-g2 in contrast with its predecessor will be flexure based and much more compact, robust, and user friendly, with ultimate intentions of becoming a commercial instrument.

2. Operational Theory

A conventional beam balance makes relative measurements, comparing the weight of an object to that of a calibrated mass. A Kibble balance, however, makes absolute measurements, comparing the weight of an object to a frequently calibrated electromagnetic force determined by electrical quantities. The experiment involves two modes of operation, velocity mode and force mode. Velocity mode is based on the principle of Faraday's law of induction. A coil of wire length L is moved at a vertical velocity v through a magnetic field of flux density B so that a voltage V is induced. The induced voltage is related to the velocity through the flux integral BL:

$$V = BLv \qquad (1)$$

Force mode is based on the Lorentz force. The gravitational force on a mass m is counteracted by an upward electromagnetic force F generated by the same coil, now energized with a current I in a magnetic field:

$$mg = BLI \qquad (2)$$

where g is the local gravitational acceleration. An expression that virtually equates electrical and mechanical power leading to a solution for mass is obtained by combining equations (1) and (2):

$$m = VI/gv \qquad (3)$$

Since KIBB-g2 strives for relative uncertainties on the order of $10^{-5}$, the Planck constant makes a subtle appearance as the means for absolutely calibrating the voltmeter and resistance standard used for the electrical measurements.

3. Balance Design

KIBB-g2 is in the initial design phase with several opportunities identified to optimize the mechanics for usability, robustness, and ergonomics. Special attention has been given to the guidance mechanism of the balance, the process for obtaining the magnet systems, and the method for measuring coil displacements. In the first generation, linear guidance was accomplished with a square cross-section air bearing system acting as a frictionless stage for coil motion coupled to a balance beam pivoting about a knife edge. Though functional, requiring a constant supply of compressed air with small flutter forces directly transmitted to the coil was undesirable.

Recent KBs and electrostatic balances under construction at NIST have been designed with flexure-based guidance systems. Flexure hinges such as those used in these balances require no maintenance, have negligible hysteresis, and demonstrate highly-reproducible motion. NIST in-house design capabilities have been leveraged to produce a similar system for KIBB-g2. The design objective is to achieve repeatable linear translation with minimal parasitic motions while maintaining a tabletop form factor.

Figure 6:
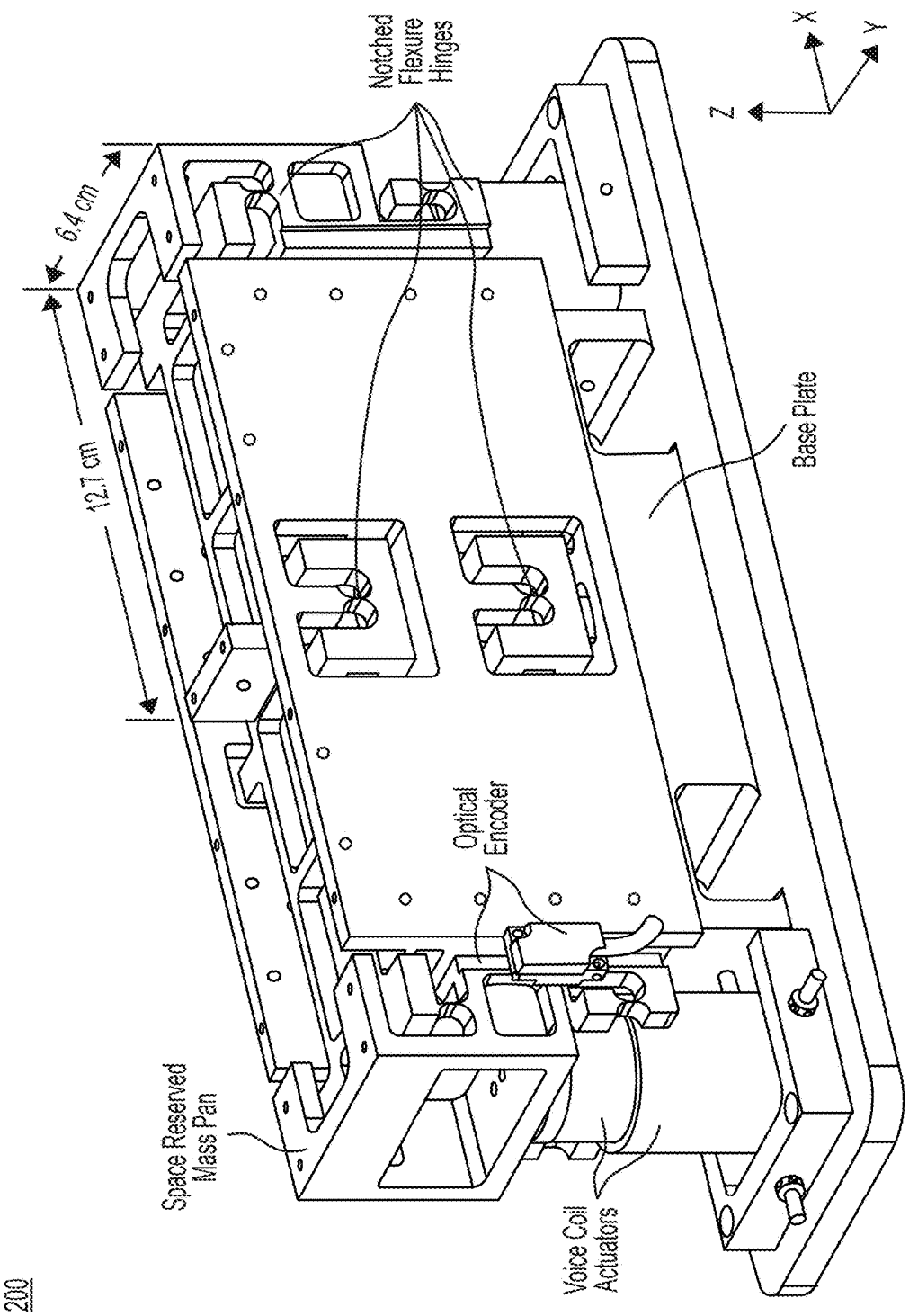
FIG. 6 shows, according to some embodiments, a perspective view of a second generation NIST Kibble balance 200. It is contemplated that second generation NIST Kibble balance 200 can be symmetric about the X-Z plane and the Y-Z plane.
Figure 7:
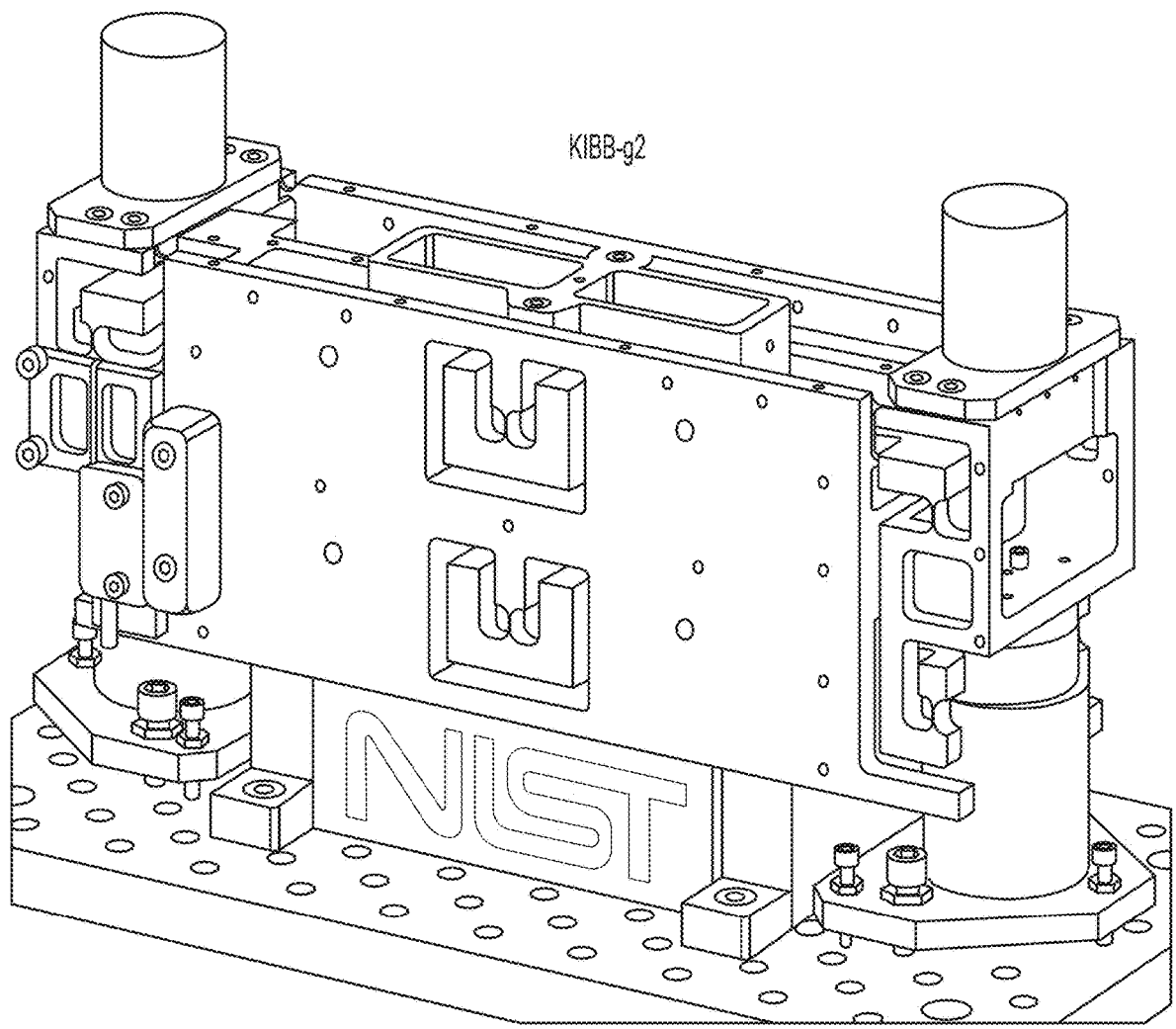
FIG. 7 shows, according to some embodiments, a perspective view of a second generation NIST Kibble balance 200, wherein relative motion of lever bar 251 and main body 201 is restricted to two dimensions by flexural bridges that bend on one axis. Here, a mass pan receives a mass to be weighed. An electromagnetic (EM) coil is disposed on each terminal end. Magnets provide a magnetic field through which the electromagnetic coils move. An optical encoder detects light, converts the light into electrical signals, and measures the movement of the coil.
Figure 8:
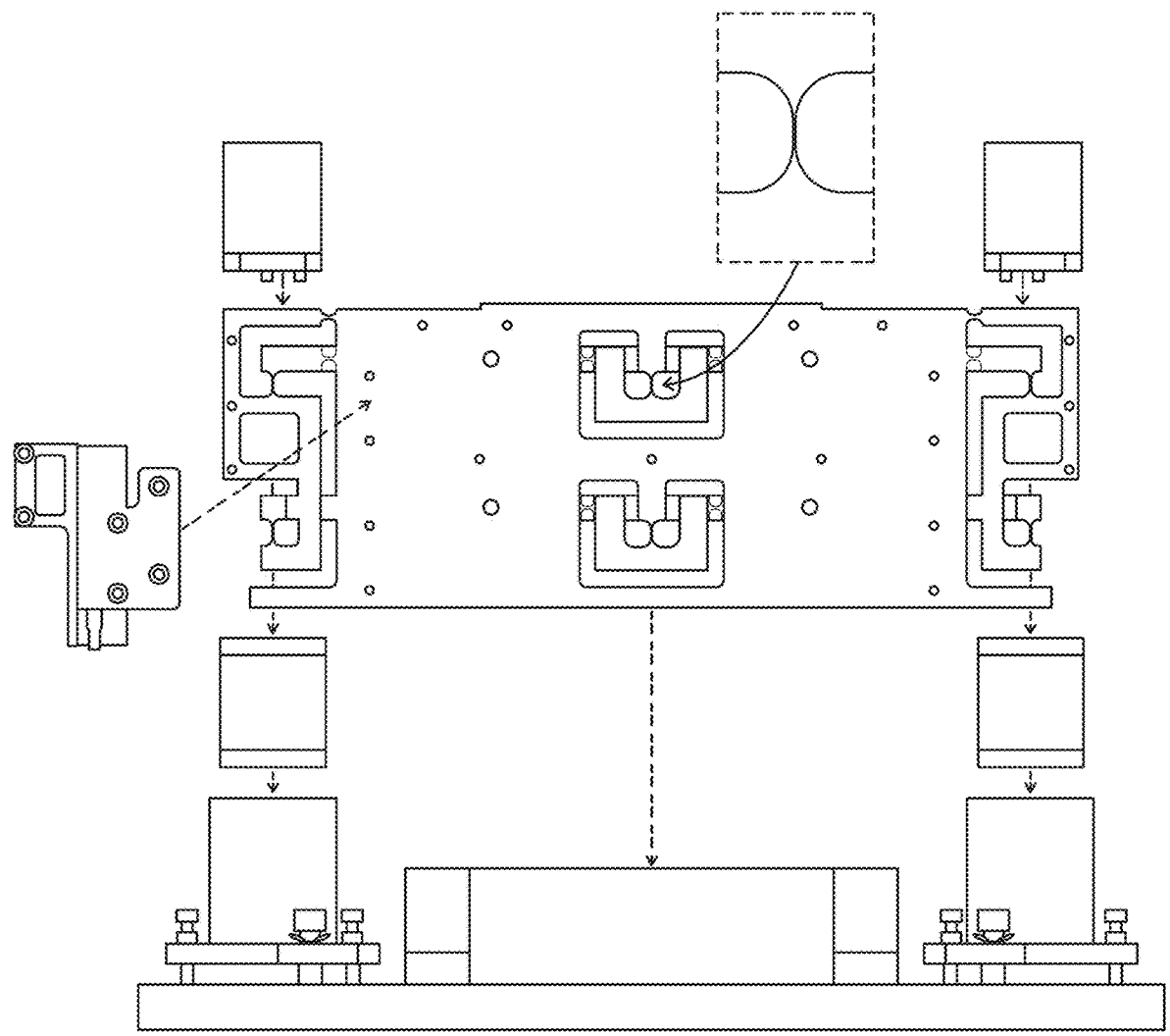
FIG. 8 shows, according to some embodiments, an exploded view of the second generation NIST Kibble balance 200 shown in FIG. 7.
Figure 9:
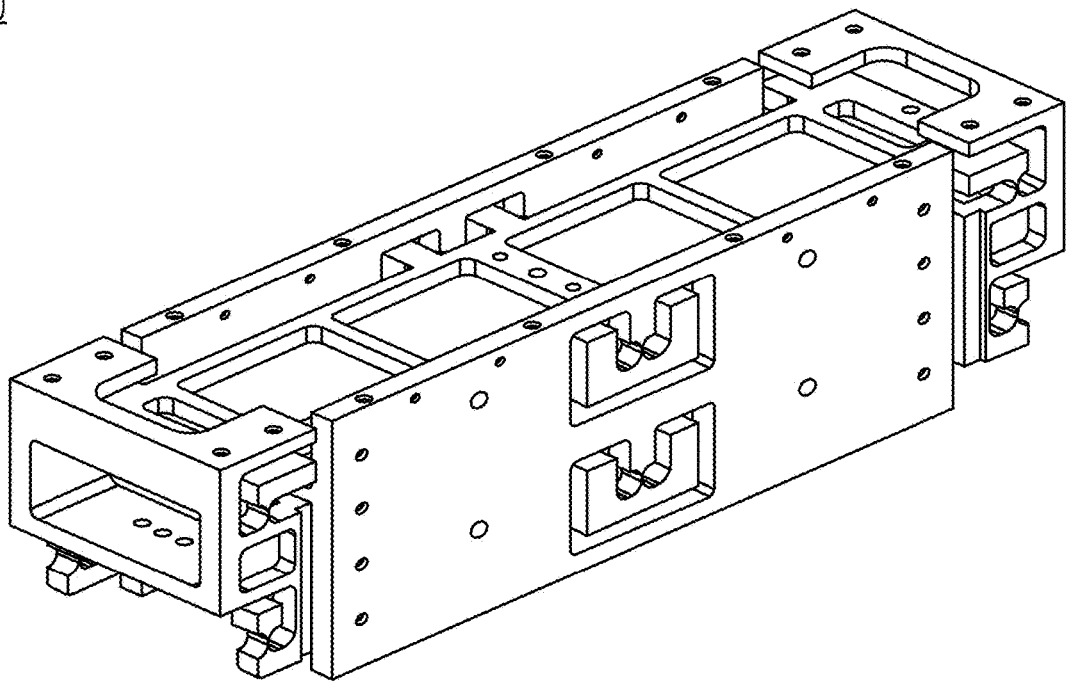
FIG. 9 shows, according to some embodiments: perspective view of components of a second generation NIST Kibble balance 200, wherein (with indication of points of attachment to the main body 201) (A) includes several flexural bridges, a measurement mass arm 249, reference force arm 250, lever bar 251, and main body 201, and (B) includes the foregoing components listed for panel A except for an absence of the main body 201.
Figure 9:
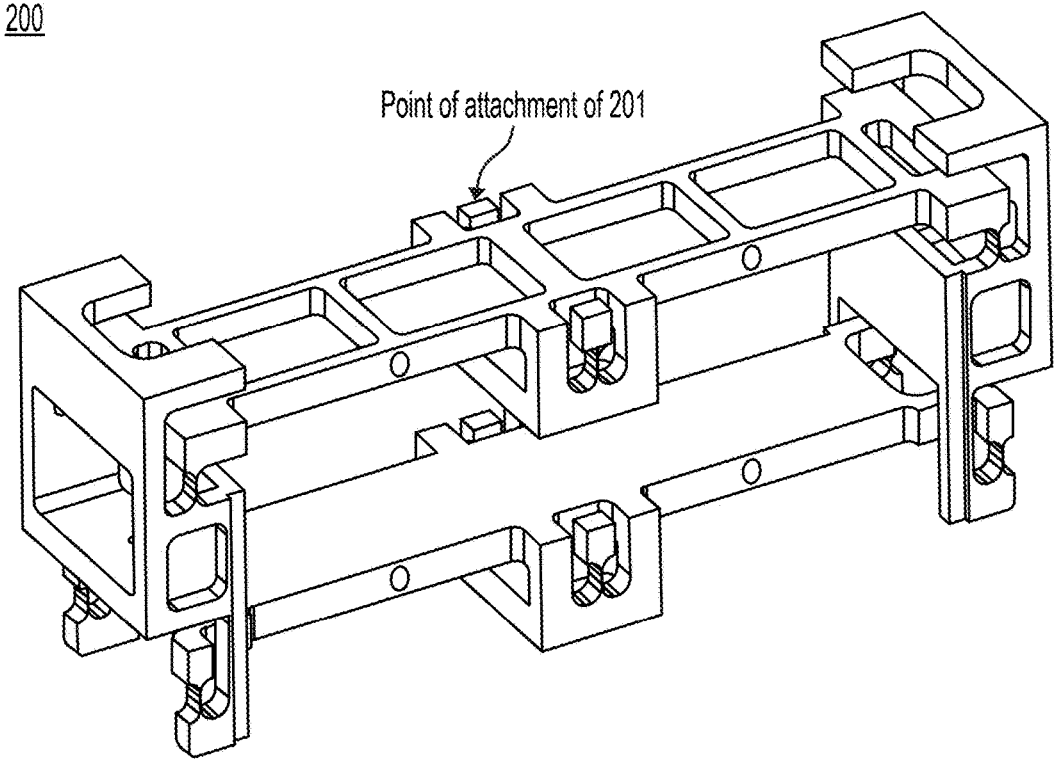
Figure 10:
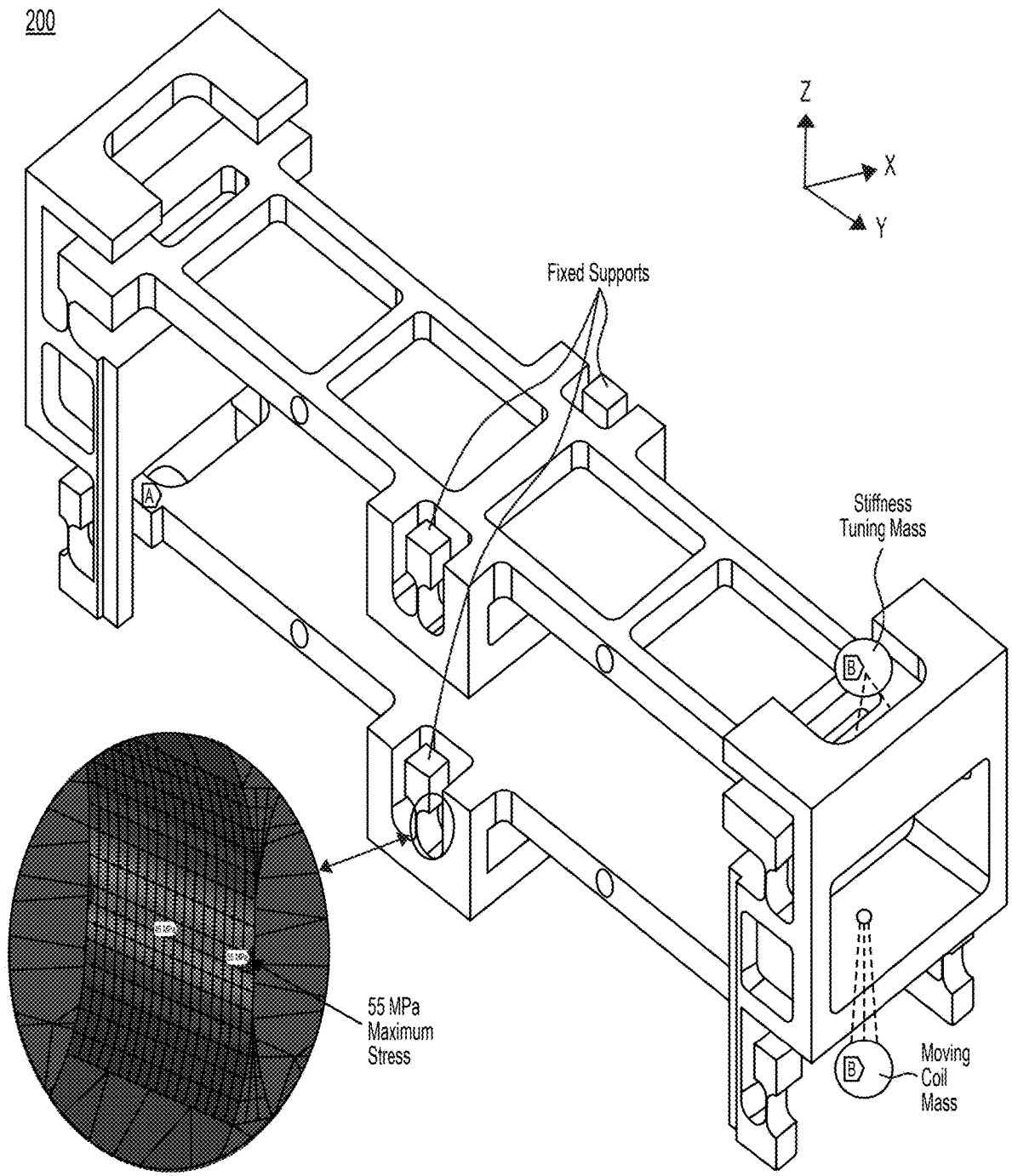
FIG. 10 shows, according to some embodiments, another perspective view for the second generation NIST Kibble balance 200 shown in panel B of FIG. 9, wherein the inset shows a stress distribution in the flexural bridge as calculated by finite element simulations for Poisson's ratio of v=0.33 and elastic modulus E=68 GPa for a system travel of 5 mm.

FIG. 6 shows locations of certain elements, including magnets, mass pan, optics, and other ancillary components. The design occupies a volume of approximate 4000 cm$^3$, approximately 10 times less than the first generation instrument which fit on a 30 cm diameter optical breadboard and measured 57 cm tall.

3.1 Flexure Guidance Mechanism

To create a ubiquitous tabletop balance, a monolithic design for the guidance mechanism has been chosen. This approach offers several advantages: 1) flexure hinges can be fabricated in a single machining setup, 2) no assembly is required, and 3) so long as machining tolerances have a negligible impact on performance, several identical parts can be made.

A compliant four-bar linkage guide mechanism has been designed and optimized using parametric simulation studies to allow repeatable linear motion with a range of +/−5 mm. Corner loading is minimal when linkage dimensions are equal and when the flexure is stiff in the cross-wise direction. With these considerations, the mechanism has been designed to be fully symmetric to allow for the option of weighing on either side and for immunity to thermal expansions. To verify manufacturability, the 3D model began as a monolithic block with dimensions of 254×63.5×88.9 mm$^3$, with only cutting operations being used to develop the part. The part has been designed with a focus on keeping as much material as possible for the static portion of the structure, while designing the moving structure to be stiff and lightweight. This will allow the static part to serve as a large, stable thermal mass and metrology frame.

The moving parts of the flexure mechanism are hidden in the center of the monolithic piece: two swings which are protected by the static frame and linked to twelve notched-style flexures. A circular geometry is easy to manufacture and allows precise rotation about the center of the hinge. To keep the footprint of the mechanism small, a dual-diameter hinge was chosen to improve compliance without the need to increase linkage length: the center portion of each flexure element follows the geometry of a 75 mm diameter circle, then tapers to a 6 mm circle. The minimum flexure thickness is 0.05 mm and has a total width of 8 mm. Such flexures are able to be reliably machined by electrical wire discharge machine. Shown in FIG. 10 a model of the moving components, with the static structure cut at each of four fixed support constraints.

Previous iterations of flexure-based balances at NIST have explored the use of materials including titanium, beryllium copper, and different alloys of aluminum. For the combination of cost, machineability, and occupational safety, aluminum is the only feasible option for a monolithic part. Some have employed aluminum 7075-T6 for a similar flexure mechanism, referencing its high yield strength. The flexure mechanism for KIBB-g2 must accommodate a magnet actuation system and employ the previously mentioned dual-diameter hinge design to satisfy the large travel requirement. Such a geometry is more difficult to machine and requires a deeper electrical discharge machining operation than similar systems at NIST, opening the door for electrode wire misalignment, taper errors, and tensioning issues at the target tolerance of 0.01 mm. Aluminum 6061-T6 and aluminum 5083-O have been identified as candidate materials that are easier to machine.

Parametric studies have been conducted to set the initial hinge and bar geometries such that: 1) the stress in the mechanism remains below the fatigue limit of either candidate materials and 2) the hinges are loaded only in tension. For the mass measurement range of KIBB-g2, the preliminary geometry has been selected and the mechanism demonstrates a peak stress of 55 MPa at the center of the hinge, shown in FIG. 10, for aluminum 6061-T6. Initial characterization of the prototype mechanism and lessons learned during the manufacturing process will allow for further optimization. The final design of the mechanism can be sized even smaller and approach the fatigue limit of the chosen material.

Because of the dominance of the flexure mechanism with respect to design decisions for the rest of the balance, the prototype mechanism has been designed to offer maximum flexibility during initial testing. Mounting has been included to offer several different options for mass pan placement, coil displacement sensing, adjustable hard stops, and other ancillary features which may become necessary as the design matures.

Several tapped holes have been included in the upper swing to allow for adjustable masses to be mounted to reduce the stiffness of the mechanism. Preliminary studies indicate an elastic linear stiffness of the prototype mechanism of 2.8 N/m. Simulations show that loading the upper swing such that the balance acts as an inverted pendulum is possible to obtain a linear stiffness less than 0.1 N/m. For the preliminary geometry, parametric studies indicate that this point occurs with a 125 g weight at approximately 27 mm above the upper swing.

To protect the mechanism during transit and machining, several sacrificial bridges, not shown, are included in the design and lock the motion of the flexures. After delivery of the mechanism, the bridges will be removed using a small rotary cutting tool. After removing the bridges, it is possible to lock motion using four safety pins which pass through the mechanism and expand after installing a long screw.

3.2 Electromagnet

As it was an experimental apparatus, the KIBB-g1 magnet system featured two coils connected in series opposition, wound in-house with a mean diameter of 73 mm, interacting with a SmCo permanent magnet. The mild steel yokes for flux guidance were designed to be adjustable, allowing for tuning of the magnetic field.

The design goals of KIBB-g2 include commercial production and minimizing the number of components fabricated in-house. As such, a modified version of a commercial VCA has been purchased. Several changes to commercial-off-the-shelf VCAs are necessary to adapt such a design for KIBB-g2. These include: 1) modifying the bobbin (coil former) to be electrically non-conductive, i.e. plastic instead of aluminum, 2) reducing the wire gauge to maximize the flux integral, and 3) changing the material of magnet from neodymium to samarium cobalt to reduce sensitivity to thermal fluctuations. The candidate VCA to be modified is a BEI Kimco LA15-26-000A, chosen for its performance, standard mounting features, and appropriate size.

Figure 20:
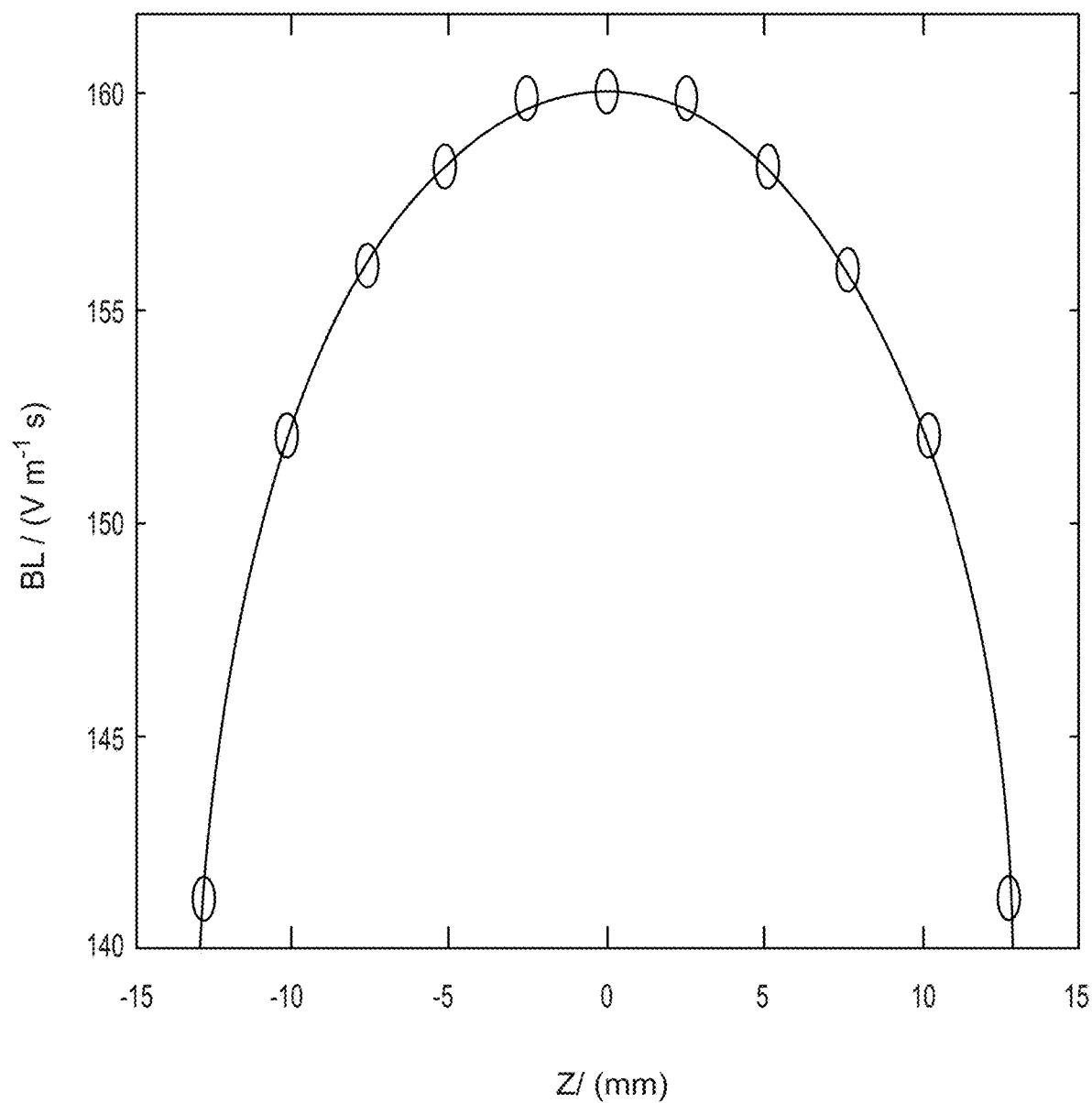
FIG. 20 shows, according to some embodiments, a graph of BL product versus distance Z, wherein dBL/dZ=0 occurs over a few mm near Z=0.

Upon implementing these modifications to the commercial VCA, the vendor has provided theoretical performance values. Shown in FIG. 20 is a plot of the flux integral BL, with a flat spot within 0.1% across a range of 5 mm. The design of the flexure guidance system and the operation modes of KIBB-g2 have been optimized to take advantage of this flat region.

The chosen VCA is approximately three times smaller than the diameter and height of the previous generation magnet system, with similar performance characteristics. The peak value of flux density is within 10% of that measured in the KIBB-g1 magnet system. Due to asymmetries in the magnet yoke pieces, we found a slope in the BL profile of the KIBB-g1 magnet system around the weighing position. For the second generation instrument, the manufacturing tolerances and theoretical performance of the modified VCA should be much better than the previous generation and closely match the final part.

The modified VCAs have been purchased and are in the manufacturing phase. Upon receipt, the BL profile of each VCA will be characterized and evaluated, including the leakage of magnetic flux for such an open-top magnet design. Using a magnetic force calculation method and preliminary gaussmeter measurements, the initial distance between the mass pan and the VCA has been set as approximately 80 mm. At this distance, an OIML class E2 10 g stainless steel mass would experience an additional force equivalent to a 7.7 μg mass due to the magnetic susceptibility of the material. Finite element simulations and characterization will be performed to optimize this spacing in the final design.

3.3 Optical Encoder

Laser interferometry is generally accepted as the de-facto method for displacement sensing of the coil in KBs. However, this method occupies a large footprint, requires complete design of an optical system, and is costly. The design philosophy of KIBB-g2 relies heavily on reducing the cost, complexity, and footprint of the previous generation instrument. Because of the relaxed uncertainty budget for the second generation instrument, it may be possible to replace the heterodyne interferometry with a system based on a commercially-available optical encoder. To characterize how well of an alignment is necessary to achieve 10 ppm-level accuracy, an auxiliary experiment has been constructed and is shown in FIG. 16.

A study of high performance commercially-available linear encoders reveals that the interpolated errors are on the order of 15 nm. However, the stability, accuracy, and interpolation errors of such encoder systems are dependent on read head/scale alignment and not traceable to a primary length standard. As such, this experiment will evaluate the short term accuracy and long term stability of the MicroE Systems Mercury II 6000 linear encoder system, with 16384x interpolation, against an Attocube 3010FPS interferometer.

Figure 16:
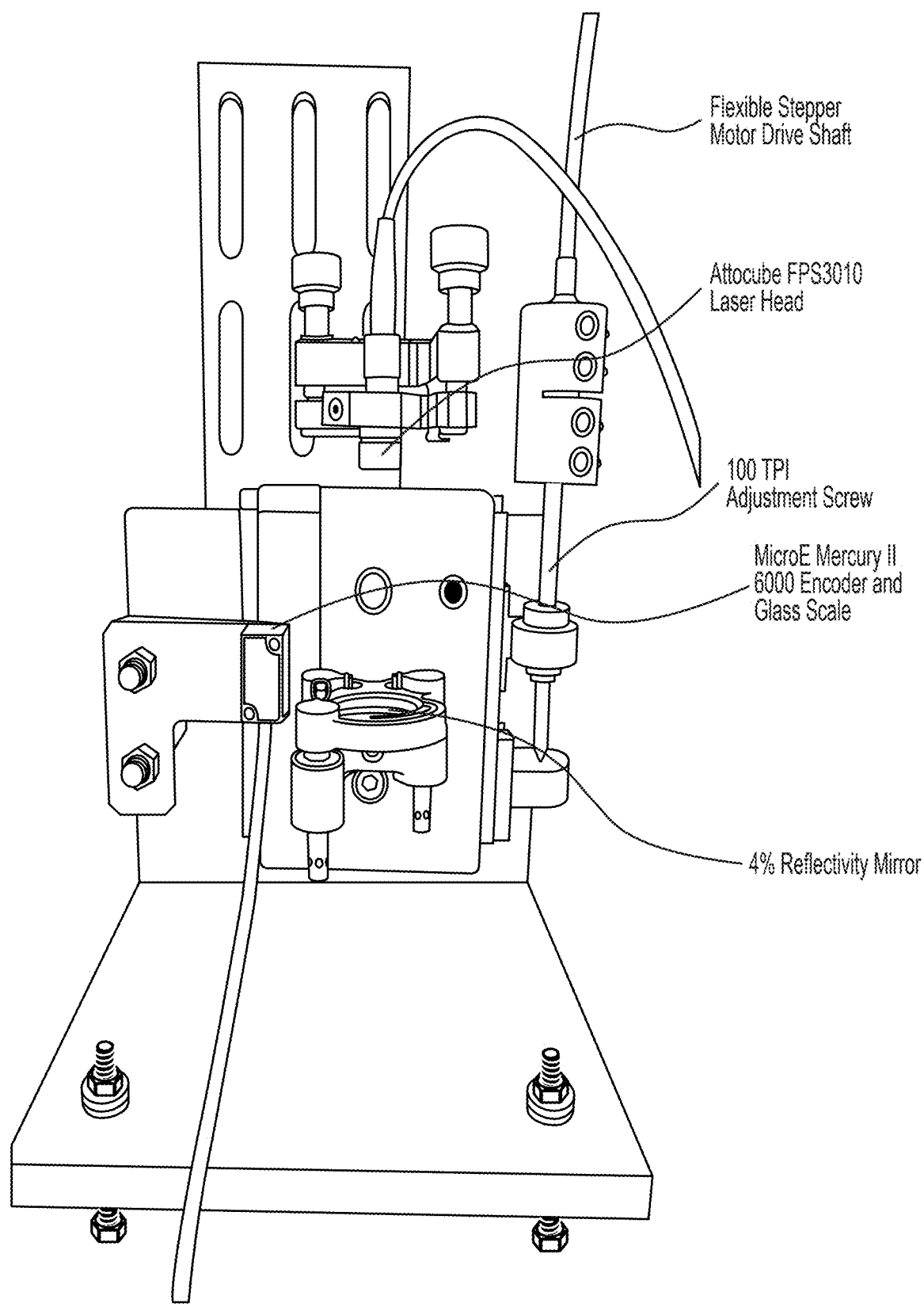
FIG. 16 shows, according to some embodiments an optical encoder as a displacement sensor 204 of a second generation NIST Kibble balance 200.
Figure 17:
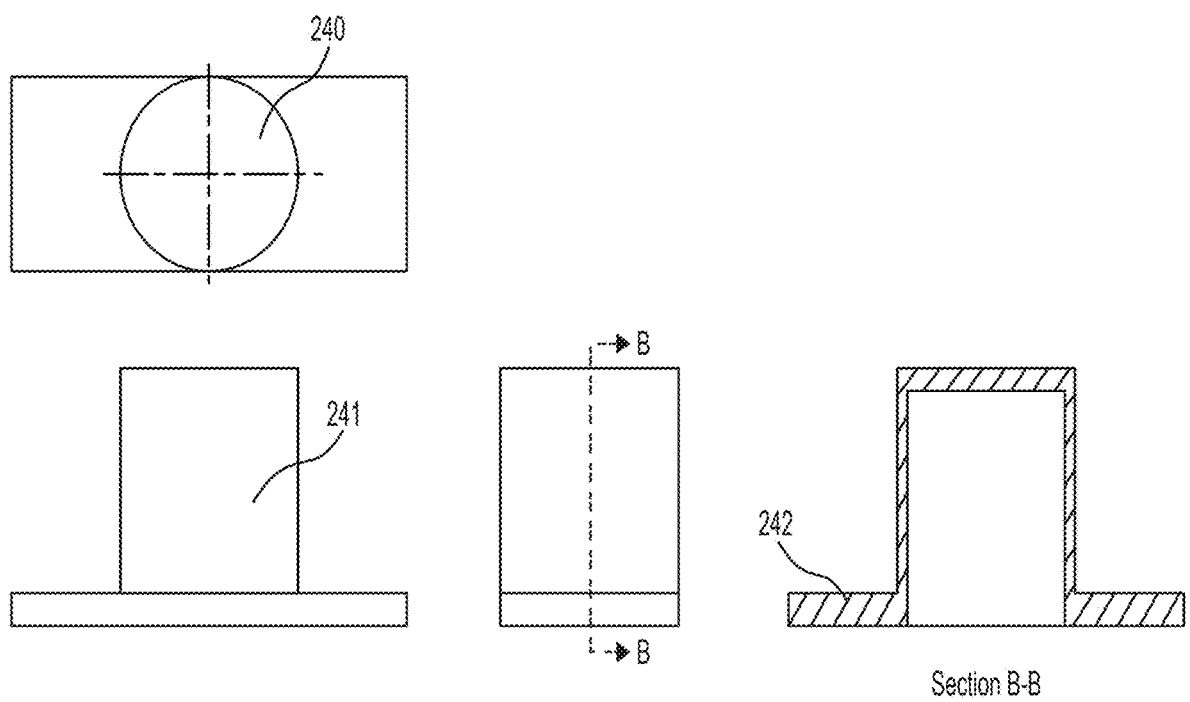
FIG. 17 shows, according to some embodiments, a mass pan 205 for a second generation NIST Kibble balance 200 in: (A) plan view, (B) side view, (C) end view, and (D) cross-section along line B-B shown in panel C.
Figure 18:
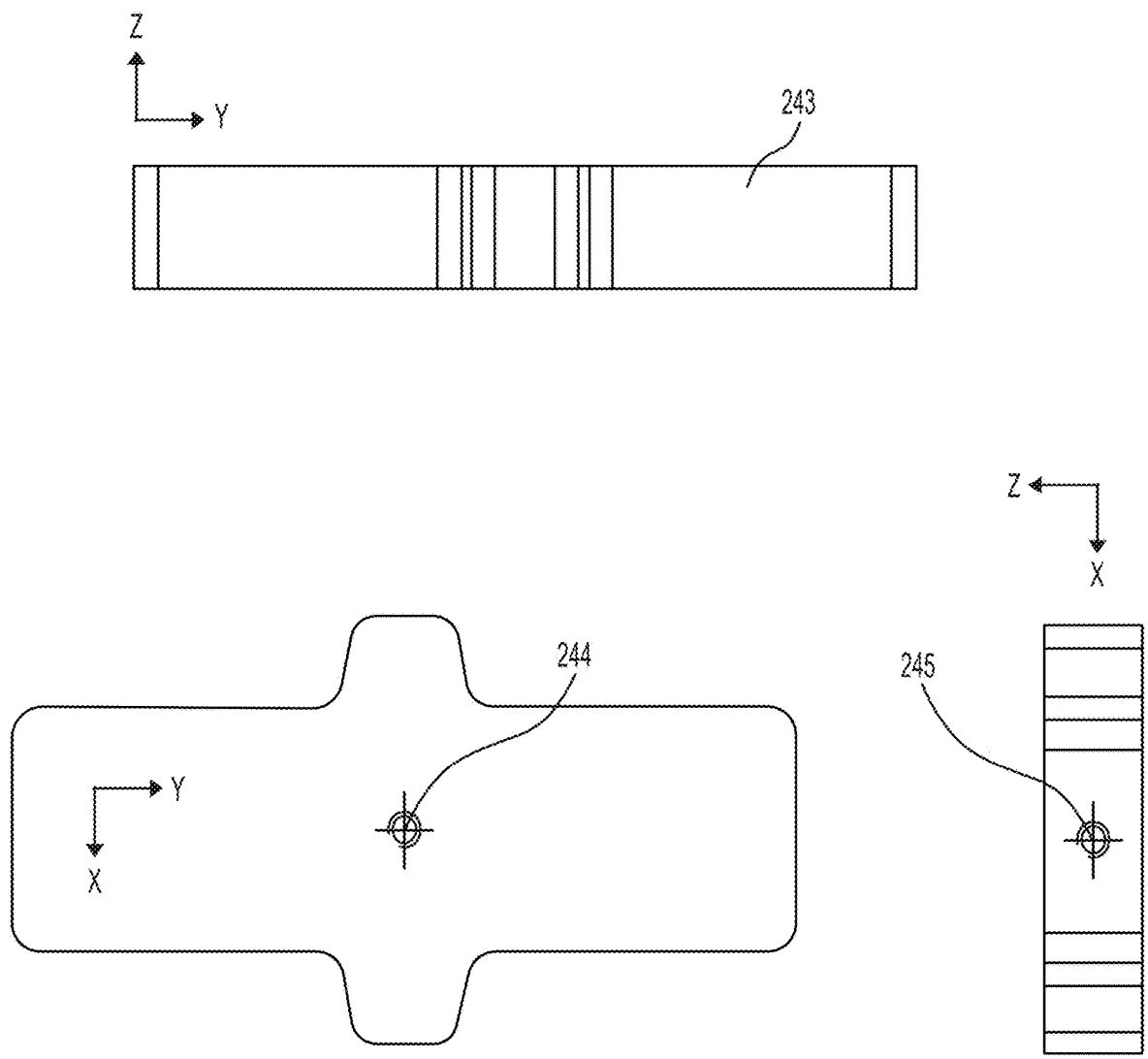
FIG. 18 shows, according to some embodiments, a flexure stiffness tuner 206 for a second generation NIST Kibble balance 200 in: (A) side view, (B) plan view, and (C) end view.
Figure 19:
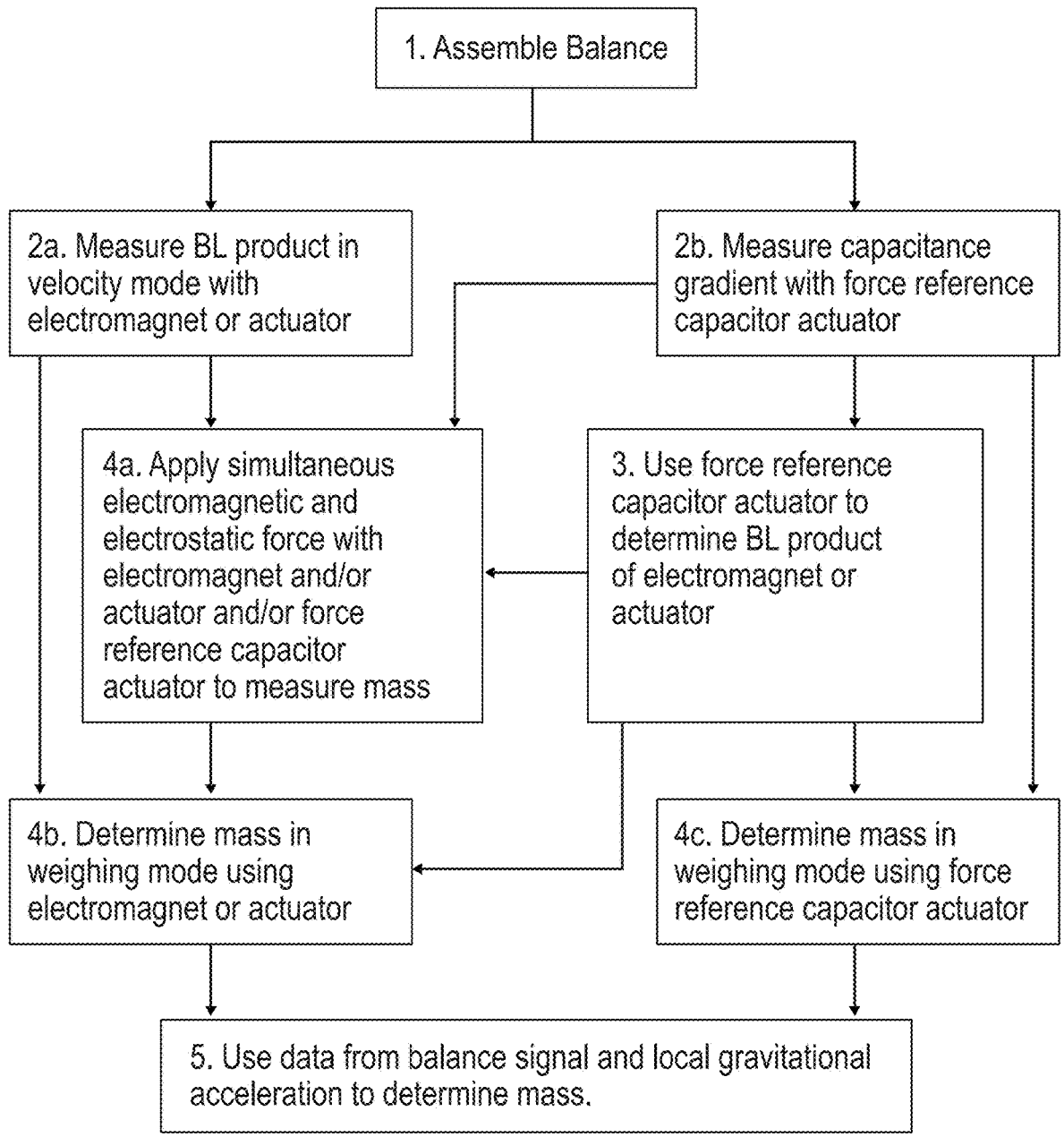
FIG. 19 shows, according to some embodiments, a process for determining absolute mass of a mass 207 with a second generation NIST Kibble balance 200.

A linear stage, with crossed-roller bearings chosen for their repeatability and stability, mounts to a vertically-oriented optical breadboard as shown in FIG. 16. An adapter plate provides a platform for both the encoder linear glass scale as well as the 4% reflector for the interferometer. The encoder readhead is mounted rigidly with a slotted adapter bracket and adjusted carefully with ring shims until the system meets manufacturer alignment specifications.

The beam path of the interferometer reference is both aligned to gravity via an alcohol pool as well as the axis of motion of the translation stage. A flex coupler connects a 100 turns-per-inch stage-adjustment screw to a stepper motor, which allows for 32 to 1 microstepping resulting in a final displacement resolution of 40 nm, a technique found in precision microscopy. Such fine resolution is important to evaluate the effect of subdivision error between graduations on the linear glass scale. The stepper motor is mounted on a separate laboratory table nearby, helping to decouple thermal and vibration effects from the breadboard that the apparatus is mounted to. Long-term studies of the stability and accuracy of the system are underway and we expect to report these results at the conference. If sufficiently stable and accurate for our target uncertainties, such a system would greatly reduce the size, complexity, and cost of future tabletop KBs.

3.4 Mass Pan

In KIBB-g1, a gimbal style, self-centering mass pan was critical to Force Mode operation. In order to lower the Type A uncertainty to $1\times10^{-6}$, about 100 mass placements and mass removals over 10 hours were necessary for adequate sampling, a procedure best conducted automatically. The gimbal was necessary so that the mass would self-center on the mass pan after each transfer. However, analyzing the data, a single Force Mode measurement is already below the target uncertainty, $3\times10^{-5}$, of KIBB-g2[2]. This relaxed accuracy indicates that a much shorter measurement time is necessary, likely on the order of minutes. Thus an automated mass handling system with a delicate gimbal mass pan is deemed unnecessary. A simple static platform should suffice for the end user to directly place and remove the test mass.

The processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware, or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

Any logical blocks, modules, and algorithm elements described or used in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described or used in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein.

A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix (s) as used herein is intended to include both the singular and the plural of the term that it modifies, thereby including at least one of that term (e.g., the colorant(s) includes at least one colorants). Option, optional, or optionally means that the subsequently described event or circumstance can or cannot occur, and that the description includes instances where the event occurs and instances where it does not. As used herein, combination is inclusive of blends, mixtures, alloys, reaction products, collection of elements, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms "a," "an," and "the" and similar referents in the context of describing the invention (especially in the context of the following claims) are to be construed to cover both the singular and the plural, unless otherwise indicated herein or clearly contradicted by context. It can further be noted that the terms first, second, primary, secondary, and the like herein do not denote any order, quantity, or importance, but rather are used to distinguish one element from another. It will also be understood that, although the terms first, second, etc. are, in some instances, used herein to describe various elements, these elements should not be limited by these terms. For example, a first current could be termed a second current, and, similarly, a second current could be termed a first current, without departing from the scope of the various described embodiments. The first current and the second current are both currents, but they are not the same condition unless explicitly stated as such.

The modifier about used in connection with a quantity is inclusive of the stated value and has the meaning dictated by the context (e.g., it includes the degree of error associated with measurement of the particular quantity). The conjunction or is used to link objects of a list or alternatives and is not disjunctive; rather the elements can be used separately or can be combined together under appropriate circumstances.

PARTS LIST second generation NIST Kibble balance 200
main body 201
actuator 202
electromagnet 203
displacement sensor 204
mass pan 205
flexure stiffness tuner 206
mass 207
actuator signal 208
209
210
211
212
electronic analyzer 213
balance signal 214
mass arm flexural bridge 215//mass arm flexural bridges 215
central flexural bridge 216//central flexural bridges 216
reference arm flexural bridge 217//reference arm flexural bridges 217
sacrificial bridge 218//sacrificial bridges 218
219
coil former 220
coil 221
inner magnet yoke 222
permanent magnet 223
outer magnet yoke 224
top electrode 225
bottom electrode 226
coil former 227
coil 228
inner magnet yoke 229
permanent magnet 230
outer magnet yoke 231
232
encoder scale 233
encoder reader head 234
laser head 235
laser beam 236 interferometer optic 237//interferometer optics 237
238
239
mass pan platform 240
mass pan cylinder 241
mass pan base 242
coarse inverted mass 243
mounting hole for z mass 244
mounting hole for y mass 245
movable electrode 246
stationary electrode 247
electrode shield 248
measurement mass arm 249
reference force arm 250
lever bar 251
main body fulcrum node 252
lever bar attachment node 253
mass arm attachment node 254
reference arm attachment node 255
lever-to-mass arm attachment node 256
lever-to-reference arm attachment node 257
mass arm feedback signal 258
reference arm signal 259
reference arm feedback signal 260
absolute mass signal 261
262

What is claimed is:

1. A second generation NIST Kibble balance for determining absolute mass, the second generation NIST Kibble balance comprising:
  a main body that provides a stationary platform: for displacement motion of a measurement mass arm and a reference force arm relative to the main body and for pivotal motion of a lever bar relative to the main body, the main body comprising a main body fulcrum node that is a fixed pivot for the lever bar;
  the lever bar in mechanical communication with the main body and that pivots about the main body fulcrum node and comprising a lever bar attachment node, such that the lever bar is suspended from the main body by a central flexural bridge disposed on the lever bar at the lever bar attachment node and pivotally moves to restore mass balance between the measurement mass arm and the reference force arm;
  the central flexural bridge in flexural mechanical communication with the main body and the lever bar, such that central flexural bridge:
    is disposed on the main body at the main body fulcrum node,
    is interposed between the main body and the lever bar, and
    flexes in response to pivotal motion of the lever bar relative to the main body;
  the measurement mass arm disposed proximate to and mechanically coupled to the main body via the lever bar, the central flexural bridge, and a mass arm flexural bridge, the measurement mass arm comprising a mass arm attachment node;
  the mass arm flexural bridge in flexural mechanical communication with the measurement mass arm and the lever bar, such that mass arm flexural bridge:
    is disposed on the measurement mass arm at the mass arm attachment node,
    is interposed between the measurement mass arm and the lever bar, and
    flexes in response to pivotal motion of the lever bar relative to the main body;
  the reference force arm disposed proximate to and mechanically coupled to the main body via the lever bar, the central flexural bridge, and a reference arm flexural bridge, the reference force arm comprising a reference arm attachment node, such that the reference force arm moves in counter-linear motion to the measurement mass arm; and
  the reference arm flexural bridge in flexural mechanical communication with the reference force arm and the lever bar, such that reference arm flexural bridge:
    is disposed on the reference force arm at the reference arm attachment node,
    is interposed between the reference force arm and the lever bar, and
    flexes in response to pivotal motion of the lever bar relative to the main body.

2. The second generation NIST Kibble balance of claim 1, wherein the lever bar further comprises a lever-to-mass arm attachment node that interconnects the lever bar and the mass arm flexural bridge.

3. The second generation NIST Kibble balance of claim 2, wherein the measurement mass arm is suspended from the lever bar by the mass arm flexural bridge disposed on the lever bar at the lever-to-mass arm attachment node.

4. The second generation NIST Kibble balance of claim 1, wherein the lever bar further comprises a lever-to-reference arm attachment node that interconnects the lever bar and the reference arm flexural bridge.

5. The second generation NIST Kibble balance of claim 4, wherein the reference force arm is suspended from the lever bar by the reference arm flexural bridge disposed on the lever bar at the lever-to-reference arm attachment node.

6. The second generation NIST Kibble balance of claim 1, further comprising a mass pan disposed on the measurement mass arm and that receives a mass for determination of an absolute mass of the mass.

7. The second generation NIST Kibble balance of claim 1, further comprising a mass pan disposed on the reference force arm and that receives a mass.

8. The second generation NIST Kibble balance of claim 1, further comprising a displacement sensor disposed on the measurement mass arm and that determines a displacement of the measurement mass arm relative to the main body.

9. The second generation NIST Kibble balance of claim 1, further comprising an actuator disposed on the measurement mass arm and that produces a force to counteract the force of gravity on the measurement mass arm.

10. The second generation NIST Kibble balance of claim 9, further comprising an electronic analyzer in electrical communication with the actuator and that receives a balance signal from the actuator, produces a mass arm feedback signal to control the actuator, and produces an absolute mass signal for a mass disposed on the measurement mass arm.

11. The second generation NIST Kibble balance of claim 1, further comprising an electromagnet disposed on the reference force arm and that produces a force to counteract the force of gravity on the reference force arm.

12. The second generation NIST Kibble balance of claim 11, further comprising an electronic analyzer in electrical communication with the electromagnet and that receives a reference arm signal from the electromagnet, produces a reference arm feedback signal to control the electromagnet, and produces an absolute mass signal for a mass disposed on the measurement mass arm.

13. The second generation NIST Kibble balance of claim 1, further comprising a flexure stiffness tuner disposed on the main body to adjust a range of pivotal motion of the lever bar relative to the main body.

14. The second generation NIST Kibble balance of claim 1, further comprising a sacrificial bridge disposed on the main body to interconnect and immobilize the measurement mass arm, the reference force arm, or the lever bar relative to the main body.

15. The second generation NIST Kibble balance of claim 1, wherein the actuator comprises an electromagnetic or a capacitor.

16. A process for determining absolute mass, the process comprising:
provide a second generation NIST Kibble balance comprising:
a main body and comprising a main body fulcrum node;
a lever bar in mechanical communication with the main body and that pivots about the main body fulcrum node;
a central flexural bridge in flexural mechanical communication with the main body and the lever bar;
a measurement mass arm mechanically coupled to the main body via the lever bar, the central flexural bridge, and a mass arm flexural bridge;
the mass arm flexural bridge in flexural mechanical communication with the measurement mass arm and the lever bar;
a reference force arm mechanically coupled to the main body via the lever bar, the central flexural bridge, and a reference arm flexural bridge; and
the reference arm flexural bridge in flexural mechanical communication with the reference force arm and the lever bar;
discretely pivoting, by the electromagnet, the lever bar relative to the main body over a plurality of different displacements of the measurement mass arm;
determining a capacitance gradient dC/dZ as a function of the different displacements of the measurement mass arm that occurs from discretely pivoting the lever bar relative to the main body;
fixing a moving electrode of the actuator at a specific position determined by the displacement sensor;
receiving the mass on the mass pan of the measurement mass arm;
measuring a first change in voltage required by the actuator to maintain the specific position;
removing the mass from the mass pan;
measuring a second change in voltage required by the actuator to maintain the specific position; and
calculating the absolute mass of the mass from the first change in voltage, the second change in voltage, and the capacitance gradient dC/dZ.

17. The process of claim 16, wherein the absolute mass of the mass is less than or equal to 100 milligrams.

18. A process for determining absolute mass, the process comprising:
providing a second generation NIST Kibble balance comprising:
a main body and comprising a main body fulcrum node;
a lever bar in mechanical communication with the main body and that pivots about the main body fulcrum node;
a central flexural bridge in flexural mechanical communication with the main body and the lever bar;
a measurement mass arm mechanically coupled to the main body via the lever bar, the central flexural bridge, and a mass arm flexural bridge;
the mass arm flexural bridge in flexural mechanical communication with the measurement mass arm and the lever bar;
a reference force arm mechanically coupled to the main body via the lever bar, the central flexural bridge, and a reference arm flexural bridge; and
the reference arm flexural bridge in flexural mechanical communication with the reference force arm and the lever bar;
oscillating, by the electromagnet, the lever bar relative to the main body to produce oscillatory linear displacements of the measurement mass arm;
calibrating an electromagnet of the actuator as a function of the oscillatory linear displacements of the measurement mass arm;
determining a BL product of the actuator after calibrating the electromagnet of the actuator;
fixing the actuator at a specific position determined by the displacement sensor;
receiving the mass on the mass pan of the measurement mass arm;
measuring a first change in voltage required by the actuator to maintain the specific position;
removing the mass from the mass pan;
measuring a second change in voltage required by the actuator to maintain the specific position; and
calculating the absolute mass of the mass from the first change in voltage, the second change in voltage, and the BL product.

19. The process of claim 18, wherein the absolute mass of the mass is greater than or equal to 100 milligrams and less than or equal to 10 grams.

* * * * *